(12) United States Patent
Damghanian et al.

(10) Patent No.: US 12,192,458 B2
(45) Date of Patent: *Jan. 7, 2025

(54) UNIFORM SEGMENT SPLIT

(71) Applicant: Telefonaktiebolaget LM Ericsson (publ), Stockholm (SE)

(72) Inventors: Mitra Damghanian, Upplands-Bro (SE); Martin Pettersson, Vallentuna (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,481

(22) Filed: Mar. 7, 2023

(65) Prior Publication Data
US 2023/0283774 A1 Sep. 7, 2023

Related U.S. Application Data

(63) Continuation of application No. 17/415,131, filed as application No. PCT/SE2019/051323 on Dec. 19, 2019, now Pat. No. 11,606,555.
(Continued)

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11); *H04N 19/1883* (2014.11)

(58) Field of Classification Search
CPC .... H04N 19/70; H04N 19/172; H04N 19/159; H04N 19/176; H04N 19/1883; H04N 19/119; H04N 19/463; H04N 19/174
See application file for complete search history.

(56) References Cited

U.S. PATENT DOCUMENTS 9,602,829 B2   3/2017  Araki
10,009,616 B2   6/2018  Minezawa et al.
(Continued)

FOREIGN PATENT DOCUMENTS

CN   104221388 A   12/2014
CN   105144720 A   12/2015
(Continued)

OTHER PUBLICATIONS

International Search Report and Written Opinion issued in International Application No. PCT/SE2019/051323 dated Mar. 26, 2020 (12 pages).
(Continued)

*Primary Examiner* — Tsion B Owens
(74) *Attorney, Agent, or Firm* — Rothwell, Figg, Ernst & Manbeck, P.C.

(57) ABSTRACT

A method for decoding a picture from a bitstream. The picture comprising a number of units, and the picture being partitioned into a number of spatial segments by a partition structure. The method includes decoding one or more code words in the bitstream; determining that the partition structure is uniform based on the one or more code words; determining the number of spatial segments based on the one or more code words; determining a segment unit size; and deriving the sizes and/or locations for spatial segments in the picture from the one or more code words. Deriving the sizes and/or locations for spatial segments in the picture comprises a first loop over the number of spatial segments in a first dimension or direction. A number of remaining segment units in the first dimension or direction to be segmented is calculated inside the first loop.

16 Claims, 12 Drawing Sheets

Related U.S. Application Data

(60) Provisional application No. 62/782,571, filed on Dec. 20, 2018.

(51) Int. Cl.
  *H04N 19/169* (2014.01)
  *H04N 19/176* (2014.01)

(56) References Cited

U.S. PATENT DOCUMENTS

| | | | |
|---|---|---|---|
| 10,142,653 | B2 | 11/2018 | Yamamoto |
| 10,511,842 | B2 * | 12/2019 | Varia .................. G06F 12/0207 |
| 10,587,800 | B2 * | 3/2020 | Boyce ................ H04N 21/4728 |
| 10,701,363 | B2 * | 6/2020 | Erden .................. H04N 19/137 |
| 10,750,170 | B2 | 8/2020 | Kim |
| 10,827,186 | B2 | 11/2020 | Moccagatta |
| 11,606,555 | B2 * | 3/2023 | Damghanian ........ H04N 19/159 |
| 2004/0194950 | A1 | 10/2004 | Restarick |
| 2010/0158401 | A1 | 6/2010 | Shiraishi |
| 2011/0145538 | A1 * | 6/2011 | Yoshioka ............ G06F 12/0253 711/171 |
| 2012/0163453 | A1 | 6/2012 | Horowitz |
| 2012/0320970 | A1 | 12/2012 | Drugeon |
| 2013/0202051 | A1 | 8/2013 | Zhou |
| 2014/0047199 | A1 * | 2/2014 | Kim .................... H04N 19/176 711/E12.001 |
| 2014/0086333 | A1 | 3/2014 | Wang |
| 2014/0301657 | A1 | 10/2014 | Hattori |
| 2014/0334539 | A1 | 11/2014 | Kim |
| 2015/0016543 | A1 | 1/2015 | Rapaka et al. |
| 2015/0023409 | A1 | 1/2015 | Schierl et al. |
| 2015/0203084 | A1 | 7/2015 | Zhu et al. |
| 2016/0261872 | A1 | 9/2016 | Wang |
| 2017/0118540 | A1 | 4/2017 | Thomas |
| 2018/0041610 | A1 | 2/2018 | Denoual et al. |
| 2018/0242028 | A1 | 8/2018 | Brandenburt et al. |
| 2019/0020851 | A1 | 1/2019 | Abe |
| 2019/0110053 | A1 * | 4/2019 | Varia ...................... H04N 19/12 |
| 2019/0238860 | A1 | 8/2019 | Lim |
| 2019/0364230 | A1 * | 11/2019 | Yeo ........................ H04N 25/44 |
| 2020/0195924 | A1 | 6/2020 | Hsiang |
| 2021/0136422 | A1 * | 5/2021 | Huang .................. H04N 5/765 |
| 2021/0152828 | A1 * | 5/2021 | Sjöberg ................ H04N 19/593 |
| 2022/0239954 | A1 * | 7/2022 | Hendry .................. H04N 19/70 |

FOREIGN PATENT DOCUMENTS

| | | | | |
|---|---|---|---|---|
| RU | | 2 683 165 | 3/2019 | |
| WO | | 2018/160034 A1 | 9/2018 | |
| WO | WO-2020130925 A1 * | | 6/2020 | ............ H04N 19/119 |

OTHER PUBLICATIONS

Mitra Damghanian et al., "AHG12: On uniform tile spacing", Joint Video Experts Team (JVET) of ITU-T SG 16 WP 3 and ISO/IEC JTC 1/SC 29/WG 11, 14th Meeting: Marrakesh, MA, Document: JVET-MO375-v1, Jan. 2019 (5 pages).

Yukinobu Yasugi et al., "AHG12: Flexible Tile Splitting", Joint Video Experts Team (JVET) of ITU-T SG 16 WP 3 and ISO/IEC JTC 1/SC 29/WG 11, 12th Meeting: Macao, CN, Document: JVET-,L0359_r4, Oct. 2018 (5 pages).

Sjoberg, R., et al., "AHG12: On Uniform Tile Partitioning", Joint Video Experts Team (JVET) of ITU-T SG 16 WP 3 and ISO/IEC JTC 1/SC 29/WG 11, 14th Meeting: Geneva, CH, Document: JVET-N0498, Mar. 19-27, 2019 (7 pages).

Bross, B., et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Document: JCTVC-K1003_v13, Oct. 10-19, 2012 (316 pages).

Ikai, Tomohiro et al., "Request for flexible unit size tile with implementation friendly restriction", Joint Video Experts Team (JVET) of ITU-T SG 16 WP3 and ISO/IEC JTC 1/SC 29/WG 11, Document: JVET-M0875_r1, 13th Meeting: Marrakech, MA, Jan. 2019 (14 pages).

Tsai, Chia-Yang et al., "AHG4/AHG9: Syntax modifications for tile width constraint", Mediatek JCTVC-J0042, Presented by Shawmin Lei 10th JCT-VC Meeting in Stockholm, Jul. 2012 (14 pages).

International Search Report and Written Opinion issued in International Application No. PCT/SE2020/050037 dated Apr. 24, 2020 (15 pages).

Mitra Damghanian et al., "AHG12: On uniform tile spacing", Joint Video Experts Team (JVET) of ITU-T SG 16 WP 3 and ISO/IEC JTC 1/SC 29/WG 11, Document; JVET-M0375-v1, 14th Meeting: Marrakesh, MA Jan. 9-18, 2019 (5 pages).

Yasugi Y et al, "AHG12: Flexible Tile Splitting", Joint Video Experts Team (JVET) of ITU-T SG 16 WP 3 and ISO/IEC JTC 1/SC 29/WG 11, Document: JVET-L0359_r4, 12th Meeting: Macao, CN, Oct. 3-12, 2018 (6 pages).

Sjöberg R et al., "AHG112: On Uniform Tile Partitioning", Joint Video Experts Team (JVET) of ITU-T SG 16 WP 3 and ISO/IEC JTC 1/SC 29/WG 11, Document: JVET-N0498, 14th Meeting: Geneva, CH, Mar. 19-27, 2019 (7 pages).

Arild Fuidseth, "Tiles", Joint Collaborative Team on Video Coding (JCT-VC) of ITU-T SG16 WP3 and ISO/IEC JTC1/SC29/WG11, Document: JCTVC-E408 rl, 5th Meeting: Geneva, CH, Mar. 16-23, 2011 (16 pages).

Recommendation ITU-T H.265, High efficiency video coding, Apr. 2013 (4 pages).

Non-Final Office Action issued in U.S. Appl. No. 18/100,877 dated Dec. 19, 2023 (6 pages).

Final Office Action issued in U.S. Appl. No. 18/100,877 dated Apr. 30, 2024 (8 pages).

ITU-T, H.265, Series H: Audiovisual and Multimedia Systems, High Efficiency Video Coding, (Feb. 2018) (692 pages).

Non-Final Office Action issued in U.S. Appl. No. 18/100,877 dated Sep. 20, 2024 (7 pages).

* cited by examiner

FIG. 1 ctuRsAddr =

| 0 | 1 | 2 | 3 | 4 |
|---|---|---|---|---|
| 5 | 6 | 7 | 8 | 9 |
| 10 | 11 | 12 | 13 | 14 |
| 15 | 16 | 17 | 18 | 19 |

FIG. 2A ctuRsAddr =

| 0 | 1 | 2 | 3 | 4 | 5 |
|---|---|---|---|---|---|
| 6 | 7 | 8 | 9 | 10 | 11 |
| 12 | 13 | 14 | 15 | 16 | 17 |
| 18 | 19 | 20 | 21 | 22 | 23 |

FIG. 2B

UNIFORM SEGMENT SPLIT

CROSS-REFERENCE TO RELATED APPLICATIONS

This is a continuation of Ser. No. 17/415,131, having a section 371(c) date of Jun. 17, 2021 (now U.S. Pat. No. 11,606,555 issued on 2023 Mar. 14), which is the 35 U.S.C. § 371 National Stage of International Patent Application No. PCT/SE2019/051323, filed Dec. 19, 2019, which claims priority to U.S. provisional application No. 62/782,571, filed on Dec. 20, 2018. The above identified applications are incorporated by reference

TECHNICAL FIELD

This disclosure relates to video encoding and decoding.

BACKGROUND

HEVC and the Next Generation Video Coding

High Efficiency Video Coding (HEVC), a.k.a. H.265, is a block-based video codec standardized by ITU-T and MPEG that utilizes both temporal and spatial prediction. Spatial prediction is achieved using intra (I) prediction from within the current picture. Temporal prediction is achieved using inter (P) or bi-directional inter (B) prediction on block level from previously decoded reference pictures. The difference between the original pixel data and the predicted pixel data, referred to as the residual, is transformed into the frequency domain, quantized and then entropy coded before transmitted together with necessary prediction parameters such as prediction mode and motion vectors, also entropy coded. By quantizing the transformed residuals, a tradeoff between bitrate and quality of the video may be controlled. The level of quantization is determined by a quantization parameter (QP). The decoder performs entropy decoding, inverse quantization, and inverse transformation to obtain the residual. The decoder then then adds the residual to an intra prediction or an inter prediction to reconstruct a picture.

MPEG and ITU-T is working on the successor to HEVC within the Joint Video Exploratory Team (JVET). The name of this video codec under development is VCC.

Slices

The concept of slices in HEVC divides the picture into independently coded slices, where each slice is read in raster scan order in units of coding tree units (CTUs). Different coding types could be used for slices of the same picture, i.e. a slice could either be an I-slice, P-slice or B-slice. The main purpose of slices is to enable resynchronization in case of data loss.

Tiles

The HEVC video coding standard includes a tool called tiles that divides a picture into rectangular spatially independent regions. Using tiles, a picture in HEVC can be partitioned into rows and columns of samples where a tile is an intersection of a row and a column. The tiles in HEVC are always aligned with CTU boundaries.

Figure 1:
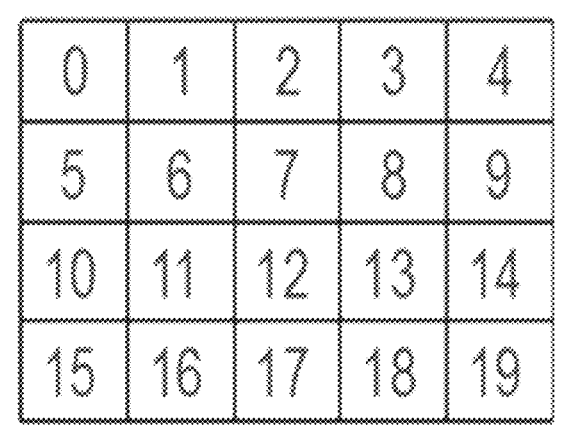

FIG. 1 shows an example of a tile partitioning using 4 tile rows and 5 tile columns resulting in a total of 20 tiles for the picture.

The tile structure is signaled in the picture parameter set (PPS) by specifying the thicknesses of the rows and the widths of the columns. Individual rows and columns can have different sizes, but the partitioning always span across the entire picture, from left to right and top to bottom respectively. There is no decoding dependency between tiles of the same picture. This includes intra prediction, context selection for entropy coding and motion vector prediction. One exception is that in-loop filtering dependencies are generally allowed between tiles.

The PPS syntax used for specifying the tile structure in HEVC is listed Table 1 below. A flag, e.g., tiles_enabled_flag, indicates whether tiles are used or not. If the flag is set, the number of tiles columns and rows are specified. The uniform_spacing_flag is a flag specifying whether the column widths and row heights are explicitly signaled or whether a predefined method to space the tile borders evenly should be used. If explicit signaling is indicated, the column widths are signaled one-by-one followed by the row heights. Such column widths and row heights are signaled in CTU units. The loop_filter_across_tiles_enabled_flag flag specifies whether in-loop filters across tile boundaries are turned on or off for all tile boundaries in the picture.

TABLE 1

Exemplary tile syntax in HEVC

|  | Descriptor |
|---|---|
| pic_parameter_set_rbsp( ) { | |
| ... | |
|   tiles_enabled_flag | u(1) |
| ... | |
|   if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i=0; i < num_tile_columns_minus1; i++ ) | |
|         column_width_minus1[ i ] | ue(v) |
|       for( i = 0; i < num_tile_rows_minus1; i++ ) | |
|         row_height_minus1[ i ] | ue(v) |
|     } | |
|     loop_filter_across_tiles_enabled_flag | u(1) |
|   } | |
| ... | |

The semantics for specifying the tile structure in HEVC are explained in further detail below:

tiles_enabled_flag equal to 1 specifies that there is more than one tile in each picture referring to the PPS. tiles_enabled_flag equal to 0 specifies that there is only one tile in each picture referring to the PPS.

num_tile_columns_minus1 plus 1 specifies the number of tile columns partitioning the picture. num_tile_columns_minus1 shall be in the range of 0 to PicWidthInCtbsY−1, inclusive. When not present, the value of num_tile_columns_minus1 is inferred to be equal to 0.

num_tile_rows_minus1 plus 1 specifies the number of tile rows partitioning the picture. num_tile_rows_minus1 shall be in the range of 0 to PicHeightInCtbsY−1, inclusive. When not present, the value of num_tile_rows_minus1 is inferred to be equal to 0.

When tiles_enabled_flag is equal to 1, num_tile_columns_ minus1 and num_tile_rows_minus1 shall not be both equal to 0.

uniform_spacing_flag equal to 1 specifies that tile column boundaries and likewise tile row boundaries are distributed uniformly across the picture. uniform_spacing_ flag equal to 0 specifies that tile column boundaries and likewise tile row boundaries are not distributed uniformly across the picture but signalled explicitly using the syntax elements column_width_minus1[i] and row_height_minus1[i]. When not present, the value of uniform_spacing_flag is inferred to be equal to 1.

column_width_minus1[i] plus 1 specifies the width of the i-th tile column in units of CTBs.

row_height_minus1[i] plus 1 specifies the height of the i-th tile row in units of CTBs.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter and sample adaptive offset filter operations. When not present, the value of loop_filter_across_tiles_enabled_flag is inferred to be equal to 1.

VVC is expected not to use traditional slices as in HEVC. Instead, tiles are expected to play a larger role in VVC due to increased demand for spatial random access from video services including VR streaming.

The concept of tile groups was agreed to be included in the current VVC draft at the last JVET meeting. A tile group is used to group multiple tiles to reduce the overhead of each tile.

Uniform Tile Partitioning in HEVC

HEVC tile partitioning requires that all tile boundaries are aligned with the CTU grid. It means that all tiles consist of full CTUs and the only incomplete CTUs allowed in the tiles are the ones located in the right or bottom edge of the picture. In HEVC, the syntax element uniform_spacing_flag equal to 1 specifies that tile column boundaries and likewise tile row boundaries are distributed uniformly across the picture. However, this uniformity is limited by the CTU granularity. In HEVC, the list colWidth[i] for i ranging from 0 to num_tile_columns_minus1, inclusive, specifies the width of the i-th tile column in units of coding tree blocks (CTBs) and is derived as the following equation (A):

```
if( uniform_spacing_flag )
  for( i = 0; i <= num_tile_columns_minus1; i++ )
    colWidth[ i ] = ( ( i + 1 ) * PicWidthInCtbsY ) /
      ( num_tile_columns_minus1 + 1 ) −
      (i * PicWidthInCtbs Y ) / (num_tile_columns_minus1 + 1)
```

A similar equation (B) is used for determining the heights of the tile rows (rowHeight[i]):

```
if( uniform_spacing_flag )
  for( j = 0; j <= num_tile_rows_minus1; j++ )
    rowHeight[ j ] = ( ( j + 1 ) * PicHeightInCtbsY ) /
      ( num_tile_rows_minus1 + 1) −
      (j * PicHeightInCtbsY ) / ( num_tile_rows_minus1 + 1 )
```

Flexible Tile Splitting

Flexible tile splitting, introduced in JVET-K0155, followed by JVET-L0359, provides the functionality to split a picture into partitioning tiles where the width or height of each tile is a multiple of a unit size finer than the CTU size. Flexible tile splitting allows the use of incomplete CTUs in the right and bottom edge of every tile (rather than only the right and bottom edge of the picture). FIGS. 2A-2B provides examples for a 2×2 tile segmentation using flexible tile splitting as in JVET-L0359 where the tile unit size is a quarter of the CTU size.

In FIGS. 2A-2B, tiles are shown by thick black lines and CTUs are shown by thin black lines. FIG. 2A shows the HEVC method with 20 CTUs in the picture. FIG. 2B shows the proposed method in JVET-L0359, with 24 CTUs in the picture and the tile unit size equal to a quarter of the CTU size, shown by dashed gray lines.

Flexible tile splitting may be useful for applications such as load balancing and 360° video with face sizes desired not to be a multiple of the CTU size.

The syntax and semantics from JVET-L0359 relevant to the current disclosure are listed below, where the italicized portions are the added text proposed in L0359.

|  | Descriptor |
| --- | --- |
| pic_parameter_set_rbsp( ) { |  |
|   pps_pic_parameter_set_id | ue(v) |
|   pps_seq_parameter_set_id | ue(v) |
|   transform_skip_enabled_flag | u(1) |
|   tiles_enabled_flag | u(1) |
|   if( tiles_enabled_flag ) { |  |
|     *tile_unit_size_idc* | *ue(v)* |
|     num_tile_columns_minus1 | ue(v) |
|     num_tile_rows_minus1 | ue(v) |
|     uniform_spacing_flag | u(1) |
|     if( !uniform_spacing_flag ) { |  |
|       for( i = 0; i < num_tile_columns_minus1; i++ ) |  |
|         column_width_minus1[ i ] | ue(v) |
|       for( i = 0; i < num_tile_rows_minus1; i++ ) |  |
|         row_height_minus1[ i ] | ue(v) |
|     } |  |
|     loop_filter_across_tiles_enabled_flag | u(1) |
|   } |  |
|   rbsp_trailing_bits( ) |  |
| } |  | tile_unit_size_idc specifies the size of a tile unit block in luma samples. The variables TileUnitSizeY, PicWidthInTileUnitsY and PicHeightInTileUnitsY are derived as follows;

*TileUnitSizeY = Max (CtbSizeY >> ( tile_unit_size_idc), 8 )*
(7-14)
*PicWidthInTileUnitsY = Ceil(pic_width_in_luma_samples ÷ TileUnitSizeY)*
(7-14)
*PicHeightInTileUnitsY = Ceil( pic_height_in_luma_samples ÷ TileUnitSizeY)*
(7-14)
*If tiles_enabled_flag is equal to 1, the variables PicWidthInCtbsY, PicHeightInCtbsY, PicSizeInCtbsY are modified as follows:*
*for(PicWidthInCtbsY = 0, i = 0; i < = num_tile_columns_minus1; i++ )*
  *PicWidthInCtbsY += Ceil( colWidth[ i ] * TileUnitSizeY ÷ CtbSizeY )*
(7-14)
*for(PicHeightInCtbsY = 0, j = 0; j <= num_tileS_rows_minus1; j++ )*
  *PicHeightInCtbsY + = Ceil(rowHeight[j] * TileUnitSizeY- CtbSizeY)*
(7-14)
*PicSizeInCtbsY = PicWidthInCtbsY * PicHeightInCtbsY*
(7-14)

num_tile_columns_minus1 plus 1 specifies the number of tile columns partitioning the picture in units of tile unit blocks. num_tile_columns_minus1 shall be in the range of 0 to PicWidthInTileUnitsY−1, inclusive. When not present, the value of num_tile_columns_minus1 is inferred to be equal to 0.

num_tile_rows_minus1 plus 1 specifies the number of tile rows partitioning the picture in units of tile unit blocks. num_tile_rows_minus1 shall be in the range of 0 to PicHeightInTileUnitsY−1, inclusive. When not present, the value of num_tile_rows_minus1 is inferred to be equal to 0.

The variable NumTilesInPic is derived as follows:

NumTilesInPic=(num_tile_columns_minus1+1)*
(num_tile_rows_minus1+1)

The list colWidth[i] for i ranging from 0 to num_tile_columns_minus1, inclusive, specifying the width of the i-th tile column in units of tile unit blocks, is derived as follows:

```
if( uniform_spacing_flag )
   for( i = 0; i <= num_tile_columns_minus1; i++ )
      posR = ( ( i + 1 ) * PicWidthInTileUnitsY ) /
(num_tile_columns_minus1 + 1 )
      posL = ( i * PicWidthInTileUnitsY ) /
(num_tile_columns_minus1 + 1 )
      colWidth[ i ] = min(PicWidthInTileUnitsY − posL, posR − posL)
else {
   colWidth[ num_tile_columns_minus1 ] = PicWidthInTileUnitsY
(6-3)
   for( i = 0; i < num_tile_columns_minus1; i++ ) {
      colWidth[ i ] = column_width_minus1[ i ] + 1
      colWidth[ num_tile_columns_minus1 ] −= colWidth[ i ]
   }
}
```

The list rowHeight[j] for j ranging from 0 to num_tile_rows_minus1, inclusive, specifying the height of the j-th tile row in units of tile unit blocks, is derived as follows:

```
if( uniform_spacing_flag )
   for( j = 0; j <= num_tile_rows_minus1; j++ )
      posB = ( ( j + 1 ) * PicHeightInTileUnitsY ) /
( num_tile_rows_minus1 + 1)
      posT = ( j * PicHeightInTileUnitsY ) / (num_tile_rows_minus1 + 1)
      rowHeight [ j ] = min(PicHeightInTileUnitsY − posT, posB − posT)
else {
   rowHeight[ num_tile_rows_minus1 ] = PicHeightInTileUnitsY
(6-4)
   for( j = 0; j < num_tile_rows_minus1; j++ ) {
      rowHeight[ j ] = row_height_minus1[ j ] + 1
      rowHeight[ num_tile_rows_minus1 ] −= rowHeight[ j ]
   }
}
```

The list TileColX[i] for i ranging from 0 to num_tile_columns_minus1+1, inclusive, specifying the X location of the top-left luma sample of the i-th tile column in units of luma samples, is derived as follows:

```
for ( TileColX[ 0 ] = 0, i = 0; i <= num_tile_columns_minus1; i++ )
   TileColX[ i + 1 ] = TileColX[ i ] + colWidth[ i ] * TileUnitSizeY
```

The list TileRowY[j] for j ranging from 0 to num_tile_rows_minus1+1, inclusive, specifying the Y location of the top-left luma sample of the j-th tile row in units of luma samples, is derived as follows:

```
for ( TileRowY[ 0 ] = 0, j = 0; j <= num_tile_rows_minus1; j++ )
   TileRowY[ j + 1 ] = TileRowY[ j ] + rowHeight[ j ] * TileUnitSizeY
```

Segment Groups, Segments and Units

Segment groups, segments, and units are now described. The term segment is used as a more general term than tiles, since the embodiments in the current disclosure may be applied to different kinds of picture partitioning schemes and not only tile partitions known from HEVC and the VVC draft. In the current disclosure, a tile is one embodiment of a segment, but there may also be other embodiments of segments.

FIG. 3A, FIG. 3B, and FIG. 3C show a picture 10 of a video stream and, respectively, an exemplary partitioning of the picture into units 8, segments 11 and segment groups 12. FIG. 3A shows a picture 10 that consists of 64 units 8. FIG. 3B shows the segment partition structure 13 of the same picture 10 consisting of 16 segments 11. The partition structure 13 is shown by dashed lines. Each segment 11 consists of a number of units. A segment can either consist of an integer number of complete units or a combination of complete and partial units. A number of segments form a segment group. FIG. 3C shows the segment group partitioning of the same picture 10 which consists of 8 segment groups. The segment group may consist of segments in raster scan order. Alternatively, the segment group may consist of any group of segments that together form a rectangle. Alternatively, the segment group may consist of any subset of segments.

FIG. 4 shows a picture 10 where the dashed lines show a partition structure dividing the picture into four segments. FIG. 4 also shows three units 16, 17, 18. As shown in the figure, two units 16, 17 belong to one current segment 15 and one unit 18 belongs to a different, neighboring segment 14. The segments are independent with respect to other segments, which means that segment boundaries are handled similar to picture boundaries when decoding the units. This affects the derivation process of elements during decoding such as, for example, the derivation of intra prediction modes and the derivation of quantization parameter values.

Intra modes are well known in the current art and are used and signaled for units that only use prediction from previously decoded samples of the current picture for sample prediction. It is common that the derivation of the intra prediction mode in a current unit 16 depends on previously derived intra prediction modes in other, neighboring units 17. With segments being independent, the derivation of the intra prediction mode in a current unit 16 may only depend on previously derived intra prediction modes in units 17 that belong to the current segment 15 and may not depend on any intra prediction mode in any unit 18 that belongs to a different segment 14.

This means that the partition structure in FIG. 4 makes the intra prediction modes in units 18 in a different segment 14 unavailable for the derivation of the intra prediction mode for the units 16 in a current segment 15. Note that the mode in some units 18 in a different segment may well have been used for derivation of an intra prediction mode in a unit 16 in a current segment 15 if those units would have belonged to the same segment. Instead, the segment boundary may have the same effect on intra mode derivation as a picture boundary for the units 16 in a current segment 15.

In the context of the current disclosure, a segment may be a tile or a slice and a segment group may be a tile group. In the current disclosure, the term "tile" and "segment" may be used interchangeably. In some embodiments, a unit may be equivalent to a CTU.

SUMMARY

According to the HEVC equations (A) and (B), the tile column widths (and row heights) are calculated by subtracting two terms from each other in the form of $\lfloor(i+1)\cdot k\rfloor - \lfloor i\cdot k\rfloor$ where i is a non-negative integer and k is a rational number with numerator equal to PicWidthInCtbsY and denominator equal to num_tile_columns_minus1+1. The output of such calculation when k is not an integer, may be equal to $\lfloor k \rfloor$ or $\lceil k \rceil$ depending on the values of k and i. This inherent feature causes variations as big as one CTU in tile column width and tile row height sizes. In the context of the current disclosure, such variations are referred to as the tile size ripple (See Table 2 below for some examples). The pattern for this ripple is not constant and depends on the width of the picture in CTU and number of tile columns and rows which give the value of k, and the positioning of the tile on the tile grid determined by i. Some examples of the ripples in the tile column width using HEVC tile partitioning with uniform_spacing_flag equal to 1 are illustrated in Table 2. The same examples can be applied to tile row heights as well.

ing_flag is equal to 1. The tile boundaries that change in case of removing some tile column(s) compared to the tile boundaries in the original picture are shown in bold lines.

Table 500 in FIG. 5 illustrates tile boundaries using HEVC uniform tile spacing. Internal tile boundaries change between the original picture and after removing some tiles from the original picture. Parameters for the original picture are set as follows: uniform_spacing_flag=1, PicWidthInCtbsY=10, num_tile_columns_minus1=3, num_tile_rows_minus1=1.

TABLE 2

| PicWidthInCtbsY | num_tile_columns_minus1 | k | colWidth[i], i = 0, 1, . . . , num_tile_columns_minus1 |
|---|---|---|---|
| 8 | 2 | 8/3 | 2, 3, 3 (smaller tile starts the grid) |
| 10 | 3 | 10/4 | 2, 3, 2, 3 (mixed tile sizes) |
| 100 | 30 | 100/31 | 3, 3, 3, 3, 4, 3, 3, 3, 4, 3, 3, 3, 4, 3, 3, 3, 4, 3, 3, 3, 3, 4, 3, 3, 3, 4, 3, 3, 3, 4 (irregular mix of tile sizes) |

Table 2 shows tile column width calculated using HEVC tile partitioning with uniform_spacing_flag equal to 1 and given values for PicWidthInCtbsY and num_tile_columns_minus1. Ripples in the values of colWidth[i] are visible.

This inconsistency in the final tile sizes is undesirable as due to a need to investigate the details of the input values and the code to predict the final tile size values. The ripple issue can happen in both horizontal and vertical directions. This makes it more difficult to determine the correct horizontal and vertical sizes of a particular tile in the tile grid without examining the details.

Another problem is that in the current implementation of HEVC for uniform spacing of the tiles, if some rows or columns of tiles in the picture are removed, the tile boundaries inside the remaining part of the picture might move according to a new ripple pattern. This will require recalculating the tile size and addresses in the tile extraction process. An example illustrated in FIG. 5 as table 500 shows how the tile column boundaries and so tile sizes might change in HEVC uniform tile spacing if some tiles are extracted from the original picture when the uniform_spac- JVET-L0359 proposes flexible tile splitting which allows for finer tile unit size granularity by providing the possibility to use incomplete CTUs in the right and bottom edge of every tile (rather than only the right and bottom edge of the picture). FIG. 2 provides an example for a 2×2 tile segmentation using flexible tile splitting as in JVET-L0359 where the tile unit size is a quarter of the CTU size and uniform_spacing_flag is equal to 1.

As proposed in JVET-L0359, if uniform_spacing_flag is equal to 1, widths of the tile columns are determined using the following equation:

```
if( uniform_spacing_flag )
    for( i = 0; i <= num_tile_columns_minus1; i++ )
        posR = ( ( i + 1 ) * PicWidthInTileUnitsY ) / (num_tile_columns_minus1 + 1 )
        posL = ( i * PicWidthInTileUnitsY ) / ( num_tile_columns_minus1 + 1 )
        colWidth[ i ] = min(PicWidthInTileUnitsY - posL, posR - posL)
    where:
        PicWidthInTileUnitsY = Ceil( pic_width_in_luma_samples ÷ TileUnitSizeY )
```

A similar equation is used for determining the heights of the tile rows (rowHeight[i]).

The above implementation shows that the ripple problem also exists for JVET-L0359 proposal. The introduced possibility for defining tile size with a granularity finer than the CTU granularity introduces yet another artifact of inconsistent tile sizes as described here. Using the algorithm proposed in L0359, the tile partitioning does not stay consistent for some picture width and tile unit size values when the tile unit size changes e.g. into half or quarter. The reason is that the proposed equation for uniform tile splitting in L0359 allows for different tile unit sizes while it does not regularize the arrangement of the slightly larger or smaller tiles in the tile grid. Table 3 below shows some examples for the cases that the picture size is fixed, and the tile unit size is changed e.g. divided into half or quarter using the flexible tile splitting proposed in L0359. The final tile column widths flip as a result of the change in the tile unit size in a way that sometimes the larger tile width is on the left side and sometimes on the right side of the picture. This unpredictability is not desired.

TABLE 3

| Picture width (in luma samples) | Tile unit size | PicWidthInTileUnitsY | num_tile_columns_minus1 | k | colWidth[i], i = 0, 1, ..., num_tile_columns_minus1 (in tile unit size) | colWidth[i], i = 0, 1, ..., num_tile_columns_minus1 (in luma samples) |
|---|---|---|---|---|---|---|
| 2160 | 32 | Ceil(67.5) = 68 | 1 | 68/2 | 34, 34 | 1072, 1088 Smaller tile starts the grid |
|  | 16 | 135 | 1 | 135/2 | 67, 68 | 1088, 1072 Larger tile starts the grid |
| 1080 | 16 | Ceil(67.5) = 68 | 1 | 68/2 | 34, 34 | 544, 536 Larger tile starts the grid |
|  | 8 | 135 | 1 | 135/2 | 67, 68 | 536, 544 Smaller tile starts the grid |
| 480 | 128 | Ceil(3.75) = 4 | 1 | 4/2 | 2, 2 | 256, 224 Larger tile starts the grid |
|  | 32 | 15 | 1 | 15/2 | 7, 8 | 224, 256 Smaller tile starts the grid |

Table 3 shows tile column width calculated using the flexible tile splitting as in L0359 when uniform_spacing_flag is set to 1.

One can conclude that a rule for organizing the inconsistency of the rounding effect on the tile sizes will make it easy to determine the final tile sizes without the need for a detailed investigation of the code and input values. A systematic approach for regularizing the tile size ripples will also give consistent tile partitioning results for the original picture and a subset of the tiles from the original picture.

Embodiments are proposed herein which regularizes the ripples on the size of the segments with a preferred order when the segment sizes cannot be exact according to the limited granularity of the division. In proposed embodiments, tiles with slightly smaller or larger sizes according to the rounding effect have a preferred arrangement. In one embodiment, the tile widths in a left to right scan direction, will only stay the same or decrease. Embodiments disclosed herein may be applied to the tile column width and/or tile row height in a tile grid or to the width and height of individual tiles. In one embodiment, the tiles with slightly larger sizes (due to the given granularity and the rounding effect) locate in the top-left part of the picture and the tiles with slightly smaller sizes locate in the bottom-right part of the picture.

In one aspect there is provided a method for decoding a picture from a bitstream. The picture comprises a number of units, and the picture is partitioned into a number of spatial segments by a partition structure, the number of spatial segments being greater than or equal to two. In one embodiment, the method includes decoding one or more code words in the bitstream. The method also includes determining that the partition structure is uniform based on the one or more code words. The method also includes determining the number of spatial segments based on the one or more code words. The method also includes determining a segment unit size. The method also includes deriving the sizes and/or locations for spatial segments in the picture from the one or more code words. The step of deriving the sizes and/or locations for spatial segments in the picture comprises a first loop over the number of spatial segments in a first dimension or direction. Additionally, a number of remaining segment units in the first dimension or direction to be segmented is calculated inside the first loop.

In one aspect there is provided a method for encoding a picture comprising a number of units into a bitstream. The picture is partitioned into a number of spatial segments by a uniform partition structure, the number of spatial segments being greater than or equal to two. The method includes encoding the information that the partition structure is uniform by encoding one or more code words into the bitstream. The method also includes encoding the number of spatial segments by encoding one or more code words into the bitstream. The method also includes determining a segment unit size. The method also includes deriving and encoding the sizes and/or locations for spatial segments in the picture into the bitstream. The step of deriving the sizes and/or locations for spatial segments in the picture comprises a first loop over the number of spatial segments in a first dimension or direction. Additionally, a number of remaining segment units in the first dimension or direction to be segmented is calculated inside the first loop.

In one aspect there is provided a method for encoding a picture wherein the method includes defining a partition structure that divides the picture into a number of uniform spatial segments, wherein each spatial segment comprises at least one unit, and wherein derivation of the segment sizes is performed in a first loop over the number of spatial segments in a first dimension or direction and a second loop over the number of spatial segments in a second dimension or direction, wherein the number of remaining segment units in the first dimension or direction to be segmented is calculated inside the first loop, and wherein the number of remaining segment units in the second dimension or direction to be segmented is calculated inside the second loop. The method also includes encoding the plurality of spatial segments in accordance with the partition structure to generate a plurality of coded spatial segments, wherein each coded spatial segment corresponds to one of the spatial segments of the partition structure, and each coded spatial segment is independent such that derivation of any intra prediction mode for a first unit of the first spatial segment depends on a derived intra prediction mode for a second unit of the first spatial segment and is independent of any intra prediction mode for units of other spatial segments of the partition structure. The method further includes generating a bit stream comprising the plurality of coded spatial segments and information indicating the uniform partition structure used to divide the picture into the plurality of spatial segments.

In one aspect there is provided a computer program, that includes instructions which when executed by processing circuitry causes the processing circuitry to perform any one of the methods disclosed herein. There is also provided in one aspect a carrier that contains the computer program. The carrier is one of an electronic signal, an optical signal, a radio signal, and a computer readable storage medium.

In another aspect a decoding apparatus for decoding a picture from a bitstream is provided. The picture comprises a number of units, and the picture is partitioned into a number of spatial segments by a partition structure, the number of spatial segments being greater than or equal to two. The decoding apparatus is configured to decode one or more code words in the bitstream. The decoding apparatus is also configured to determine that the partition structure is uniform based on the one or more code words. The decoding apparatus is also configured to determine the number of spatial segments based on the one or more code words. The decoding apparatus is also configured to determine a segment unit size. The decoding apparatus is also configured to derive the sizes and/or locations for spatial segments in the picture from the one or more code words. Deriving the sizes and/or locations for spatial segments in the picture comprises a first loop over the number of spatial segments in a first dimension or direction. Additionally, the decoding apparatus is configured to calculate a number of remaining segment units in the first dimension or direction to be segmented inside the first loop. In some embodiments, the decoding apparatus includes a computer readable storage medium and processing circuitry coupled to the computer readable storage medium, wherein the processing circuitry is configured to cause the decoding apparatus to perform any of the decoding methods disclosed herein.

In another aspect an encoding apparatus for encoding a picture into a bitstream is provided. The picture comprises a number of units and the picture is partitioned into a number of spatial segments by a uniform partition structure, the number of spatial segments being greater than or equal to two. The encoding apparatus is configured to encode the information that the partition structure is uniform by encoding one or more code words into the bitstream. The encoding apparatus is also configured to encode the number of spatial segments by encoding one or more code words into the bitstream. The encoding apparatus is also configured to determine a segment unit size. The encoding apparatus is further configured to derive and encoding the sizes and/or locations for spatial segments in the picture into the bitstream. Deriving the sizes and/or locations for spatial segments in the picture comprises a first loop over the number of spatial segments in a first dimension or direction. Additionally, the encoding apparatus is further configured to calculate a number of remaining segment units in the first dimension or direction to be segmented inside the first loop.

In another aspect an encoding apparatus for encoding a picture is provided, where the encoding apparatus is configured to define a partition structure that divides a picture into a number of uniform spatial segments, wherein each spatial segment comprises at least one unit, and wherein derivation of the segment sizes is performed in a first loop over the number of spatial segments in a first dimension or direction and a second loop over the number of spatial segments in a second dimension or direction, wherein the number of remaining segment units in the first dimension or direction to be segmented is calculated inside the first loop, and wherein the number of remaining segment units in the second dimension or direction to be segmented is calculated inside the second loop. The encoding apparatus is also configured to encode the plurality of spatial segments in accordance with the partition structure to generate a plurality of coded spatial segments, wherein each coded spatial segment corresponds to one of the spatial segments of the partition structure, and each coded spatial segment is independent such that derivation of any intra prediction mode for a first unit of the first spatial segment depends on a derived intra prediction mode for a second unit of the first spatial segment and is independent of any intra prediction mode for units of other spatial segments of the partition structure. The encoding apparatus is further configured to generate a bit stream comprising the plurality of coded spatial segments and information indicating the uniform partition structure used to divide the picture into the plurality of spatial segments.

In another aspect there is provided an encoding apparatus for encoding a picture, wherein the encoding apparatus comprises a computer readable storage medium and processing circuitry coupled to the computer readable storage medium. The processing circuitry is configured to cause the encoding apparatus to perform any one of the encoding methods disclosed herein.

Embodiment of this disclosure keep the width of the current tile independent of the previous tiles but only on the remaining number of units (in the column or row) that are going to be partitioned into the remaining number of tiles. As a result, the embodiments for uniform spacing of tiles keeps the tile partitioning intact for the extracted and remaining tiles if tiles are extracted. This will remove the need for recalculating the tile sizes in case of a picture split or tile extraction. In the current implementation of HEVC for uniform spacing of the tiles, if some rows or columns of tiles in the picture are removed, the ripple pattern might change and the tile boundaries inside the remaining part of the picture might move according to the new ripple pattern.

Consistency is another advantage of the embodiments. The embodiments for uniform spacing of the tiles organizes the tile sizes (e.g. tile column width and the tile row height) and provides a rule for the final arrangement of tile sizes without any detailed investigation of the input parameters or the code. For instance, in one embodiment, when the picture width/height in tile unit is not divisible by the number of tile columns/rows, then all the tiles rounded to larger sizes are found on the left/top part of the picture. The embodiments also regulate ripples of the tile sizes in uniform tile spacing in case of changes to the tile unit size.

The proposed methods also reduce complexity compared to HEVC and flexible tile split proposed in JVET-L0359.

The proposed method has no multiplication and only 1 division per iteration for determining the widths of the tile columns and the heights of the tile rows, while the HEVC method uses 2 multiplications and 2 divisions per iteration.

BRIEF DESCRIPTION OF THE DRAWINGS

The accompanying drawings, which are incorporated herein and form part of the specification, illustrate various embodiments.

FIG. 1 shows an example of tile partitioning according to one embodiment.

FIG. 2A shows tile segmentation using HEVC tile partitioning—

FIG. 2B shows tile segmentation using flexible tile splitting.

DETAILED DESCRIPTION

Figure 3A:
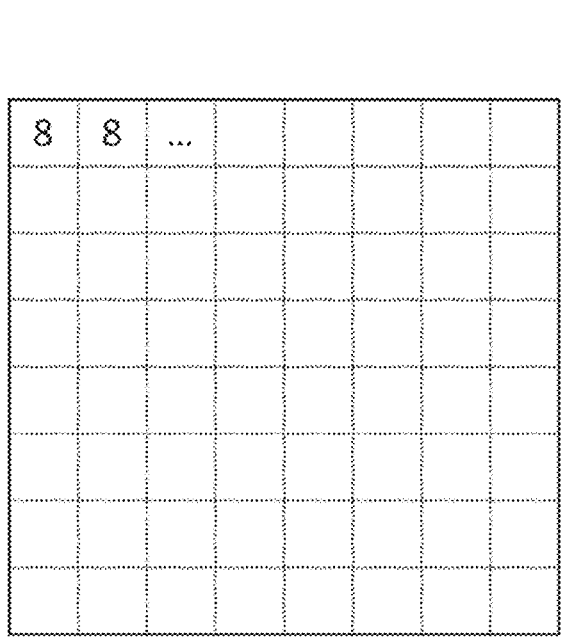
FIGS. 3A, 3B, and 3C show a picture of a video stream and exemplary partitioning.
Figure 3B:
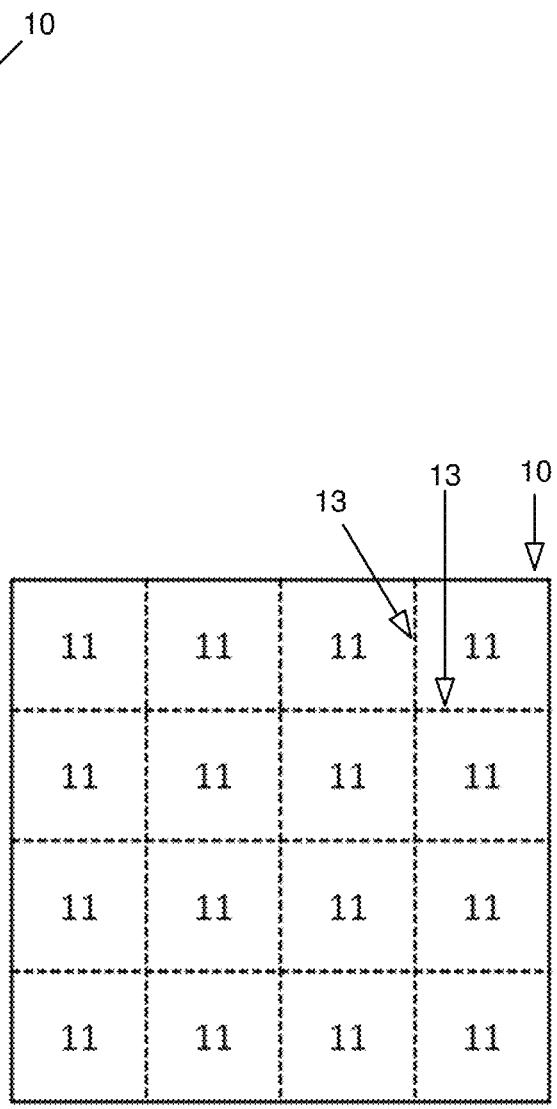
Figure 3C:
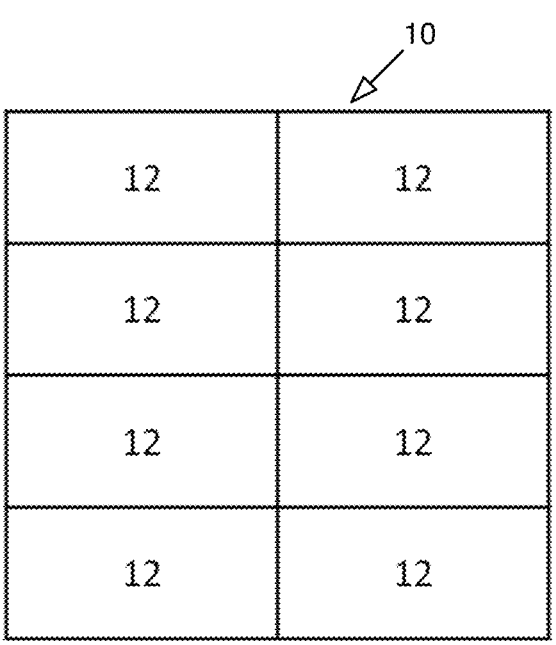
Figure 4:
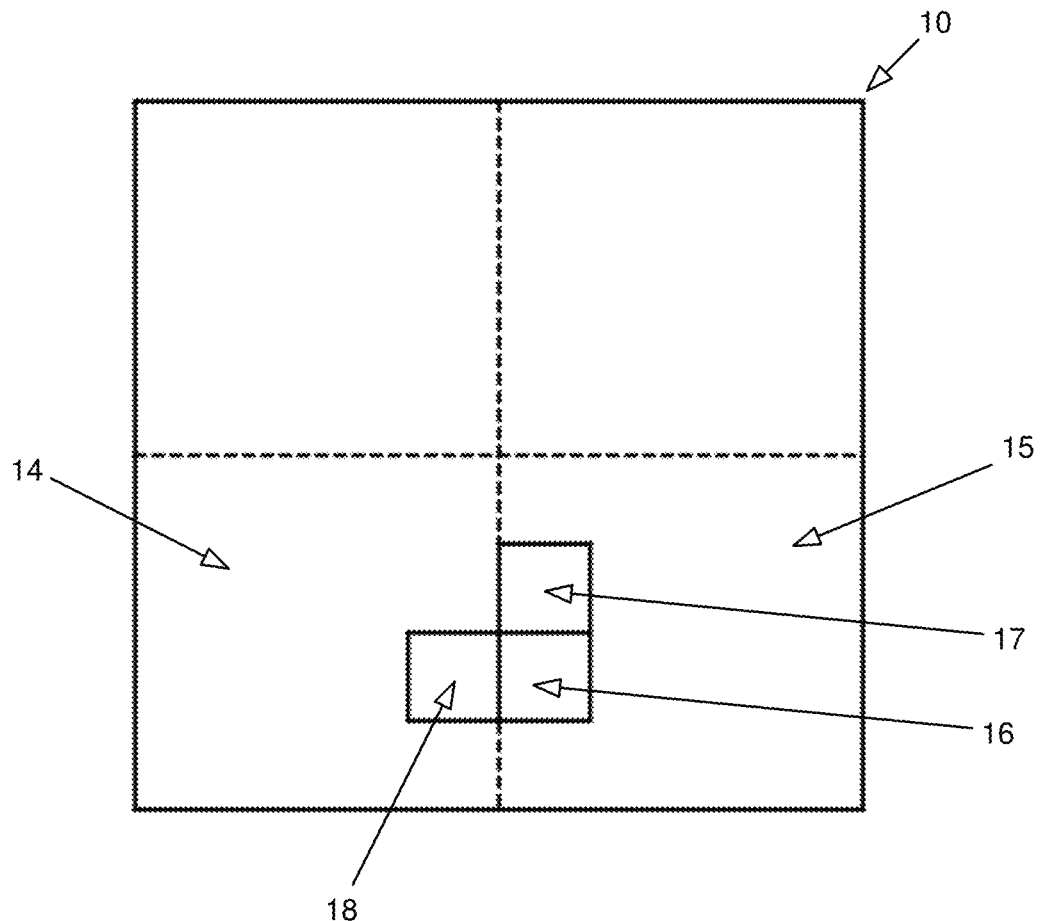
FIG. 4 shows a picture according to some embodiments.
Figure 5:
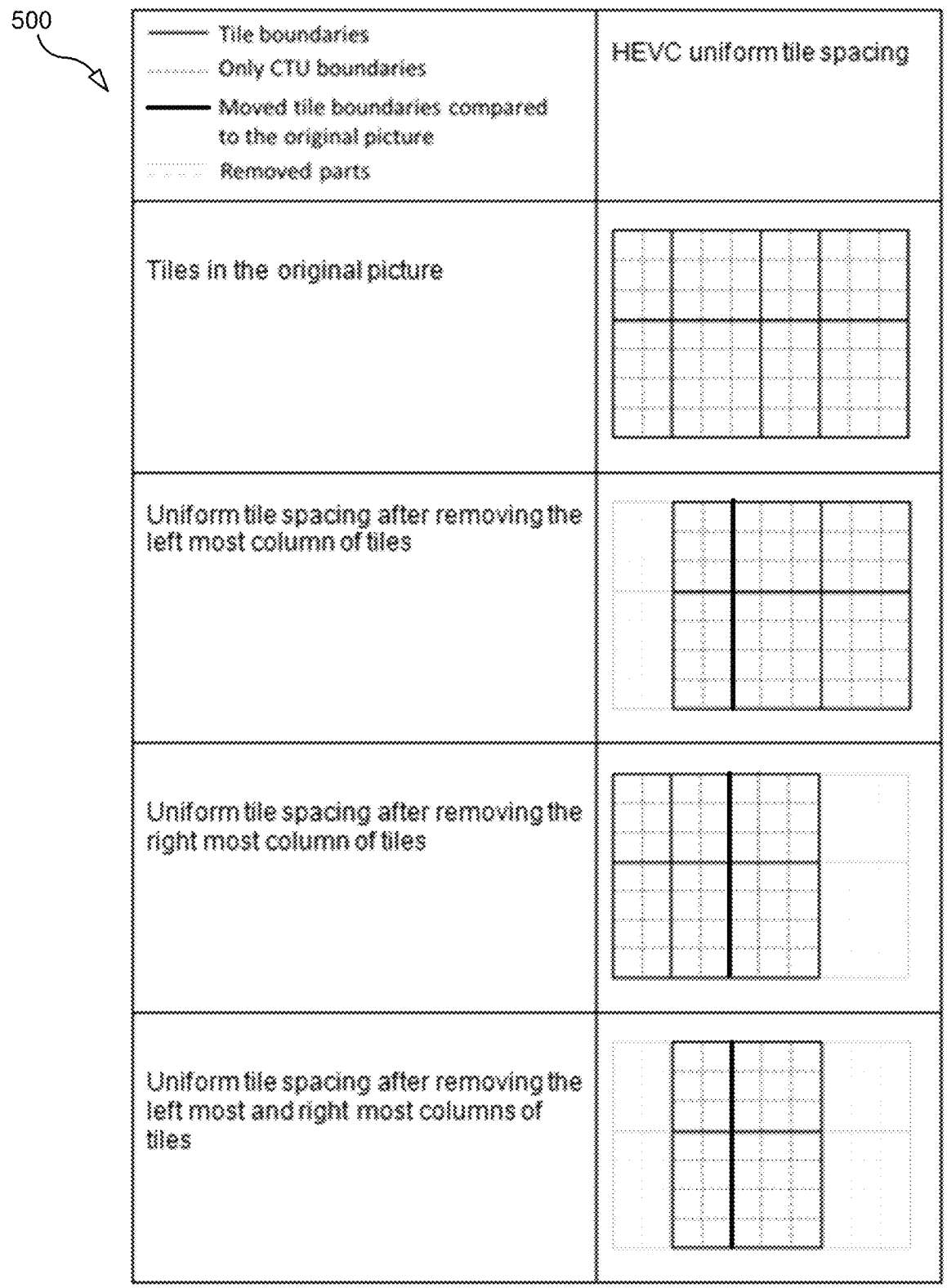
FIG. 5 shows a table according to some embodiments.

The following terminology has been used to describe the embodiments:

The arithmetic operator "I" is used for integer division with truncation of the result toward zero. For example, 7/4 and −7/−4 are truncated to 1 and −7/4 and 7/−4 are truncated to −1.

The arithmetic operator "÷" is used for division in mathematical equations where no truncation or rounding is intended.

Ceil(x) gives the smallest integer greater than or equal to x.

Floor(x) gives the largest integer less than or equal to x.

The terms "tile column width" and "tile width" are used interchangeably which means embodiments can be applied when the tile column widths are being calculated in a tile grid or when the tile widths are being calculated individually (e.g. if there is no tile grid).

The terms "tile row height" and "tile height" are used interchangeably which means the embodiments can be applied when the tile row heights are being calculated in a tile grid or when the tile heights are being calculated individually (e.g. if there is no tile grid).

Embodiments for defining the width (and equivalently the height) of the tiles for uniform_spacing_flag=1 have the following four elements:

(1) In the loop for defining the width of each tile, the width for the tile is defined using the available remaining unit sizes which means the number of unit sizes in the row which are not yet allocated to a tile.

(2) The number of remaining unit sizes is then divided by the number of remaining tiles in the row.

(3) The obtained tile size is rounded towards the larger or smaller integer (Ceil( ) or Floor( ) functions) according to the given rule for ordering the width of the tiles.

(4) An optional element to recalculate the number of remaining unit sizes (e.g. CTUs) in every iteration of the loop for defining the width of each tile.

The same elements apply to defining the height of the tiles.

Embodiments disclosed herein describes a decoder method for decoding a picture 10 from a bitstream, the method comprising deriving the sizes and/or locations for segments in the picture (e.g., all segments in the picture) from the bitstream, wherein the picture 10 consists of a number of units 8 and a partition structure 13 partitions the picture into at least two segments 11 and the decoder determines that the spatial segmentation is uniform by decoding one or more code words in the bitstream, and the decoder determines the number of spatial segments by decoding one or more code words in the bitstream, and the decoder determines a tile unit size, and the partitioning of the segments to uniform widths or heights follows a fixed ripple pattern independent from the number of the spatial segments, and the derivation of the segment sizes is done in a loop over the number of segments, where inside the loop the number of remaining tile units to be segmented is calculated. The number of remaining segments may also be calculated inside the loop.

In one example, an embodiment replaces the following HEVC lines:

```
if( uniform_spacing_flag )
    for( i = 0; i <= num_tile_columns_minus1; i++ )
        colWidth[ i ] = ( ( i + 1 ) * PicWidthInCtbsY ) / ( num_tile_columns_minus1 + 1 ) −
            ( i * PicWidthInCtbsY ) / ( num_tile_columns_minus1 + 1 )
``` with the following lines:

```
if( uniform_spacing_flag ){
    A = PicWidth InCtbsY
    B = num_tile_columns_minus1 + 1
    for( i = 0; i <= num_tile_columns_minus1; i++ ){
        colWidth[ i ] = Ceil( A ÷ B)
        A −= colWidth[ i ]
        B −= 1
    }
}
```

The proposed method also reduces complexity compared to HEVC and flexible tile split proposed in JVET-L0359. The proposed method has no multiplication and only 1 division per iteration for determining the widths of the tile columns and the heights of the tile rows, while the HEVC method uses 2 multiplications and 2 divisions per iteration.

Embodiment 1. Monotonic Ripple

In an embodiment, the width of the segments in a row or the height of the segments in a column is never in ascending or never in descending order following a predefined scan direction. The segment may be a tile in a picture and so the tile sizes are monotonic (never ascending or never descending) in a scan direction. For example, for tile widths to be never ascending in the left to right scan direction means that the width of a tile is never larger than the width of another tile on the same row which is spatially located to the left of the first tile.

In the first embodiment, for a never ascending tile column width (left to right scan direction) and tile row height (top to bottom scan direction) on top of HEVC, the following HEVC functions:

```
if( uniform_spacing_flag )
   for( i = 0; i <= num_tile_columns_minus1; i++ )
      colWidth[ i ] = ( ( i + 1 ) * PicWidthInCtbsY ) / ( num_tile_columns_minus1 + 1 ) –
         ( i * PicWidthInCtbs Y ) / ( num_tile_columns_minus1 + 1 )
and
if( uniform_spacing_flag )
   for( j = 0; j <= num_tile_rows_minus1; j++ )
      rowHeight[ j ] = ( ( j + 1 ) * PicHeightInCtbsY ) / (num_tile_rows_minus1 + 1 ) –
         ( j * PicHeightInCtbsY ) / ( num_tile_rows_minus1 + 1 )
``` are replaced with the following functions:

```
if( uniform_spacing_flag ) {
   A = PicWidthInCtbsY
   B = num_tile_columns_minus1 + 1
   for( i = 0; i <= num_tile_columns_minus1; i++ ) {
      colWidth[ i ] = Ceil( A ÷ B)
      A -= col Width[ i ]
      B -= 1
   }
}
and
if( uniform_spacing_flag ) {
   C = PicHeightInCtbsY
   D = num_tile_rows_minus1 + 1
   for( j = 0; j <= num_tile_rows_minus1; j++ ) {
      row Height[ j ] = Ceil( C ÷ D)
      C -= rowHeight [ j ]
      D -= 1
   }
}
```

The resulting values in the colWidth and rowHeight lists are in units of luma coding tree block. If for instance the CTU size is equal to 128×128, the values are in units of 128 luma samples such that a value of 2 means 256 luma samples.

The colWidth and rowHeight lists are then used by the decoder to determine the scan order of blocks in the picture. When block data is decoded, the spatial position of a block is based on the values in the colWidth and rowHeight lists. The decoder may construct conversion lists from tile scan addresses to raster scan addresses and the other way around using the values in colWidth and rowHeight. A decoder may then use the conversion lists during decoding to determine the spatial positions of blocks. In HEVC, conversion lists are used and called CtbAddrRsToTs and CtbAddrTsToRs.

Figure 6:
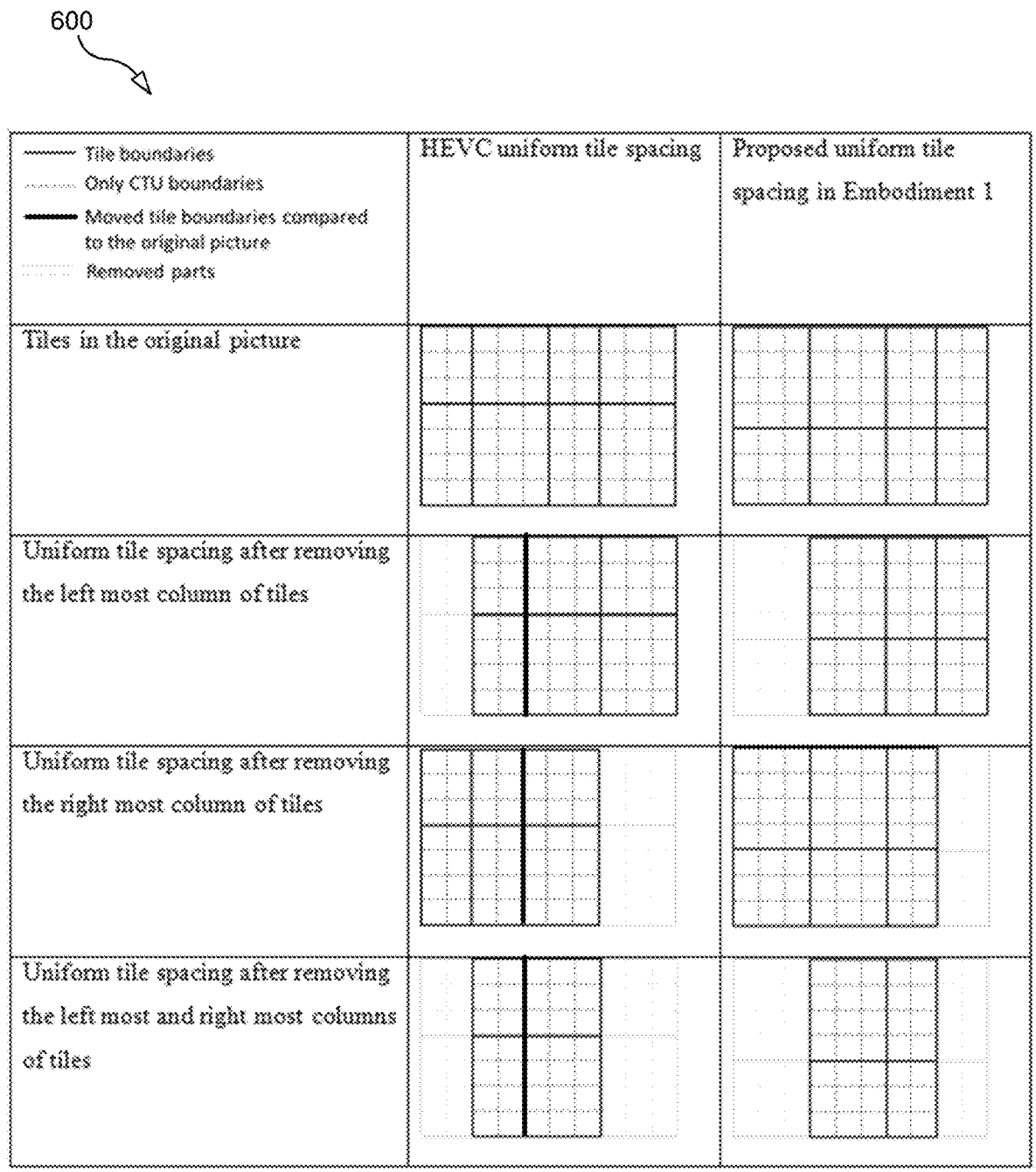
FIG. 6 shows a table according to some embodiments.

FIG. 6 shows table 600 which compares the tile size allocation for HEVC and the above exemplary implementation of the first embodiment. As shown in table 600, in one embodiment, the tile boundaries are kept the same as the original picture when tile columns are removed from the left or right or both sides of the picture. The rounding effect is governed to put the slightly wider tiles on the left side of the picture in all cases using the Ceil( ) function and recalculating the number of the remaining tile units in every iteration of the loop over tiles to determine tile column widths.

Table 600 shows how the internal tile boundaries change after removing some tile columns from the original picture using HEVC uniform tile spacing while the internal tile boundaries are kept intact. The parameters for the original picture are set as follows: uniform_spacing_flag=1, PicWidthInCtbsY=10, num_tile_columns_minus1=3, num_tile_rows_minus1=1.

Below is another example of the first embodiment, built on top of the equations proposed in JVET-L0359 which supports tile size granularities smaller than the CTU size. The following equation changes are proposed on top of JVET-L0359:

```
if( uniform_spacing_flag ) {
   A = PicWidthInTileUnitsY
   B = num_tile_columns_minus1 + 1
   for( i = 0; i <= num_tile_columns_minus1; i++ ) {
      posR = ( ( i + 1 ) * PicWidthInTileUnitsY ) / ( num_tile_columns_minus1 + 1 )
      posL = ( i * PicWidthInTileUnitsY ) / ( num_tile_columns_minus1 + 1 )
      colWidth[ i ] = min (PicWidthInTileUnitsY-posL, posR-posL)
      colWidth[ i ] = Ceil( A ÷ B)
      A -= col Width[ i ]
      B -= 1
   }
}
where:
PicWidthInTileUnitsY = Ceil( pic_width_in_luma_samples ÷ TileUnitSizeY )
``` and equivalently for the tile row heights the following changes are proposed:

```
if( uniform_spacing_flag ) {
    C = PicHeightInTileUnitsY
        D = num_tile_rows_minus1 + 1
    for( j = 0; j <= num_tile_rows_minus1; j++ ) {
            ~~posB = ( ( i + 1 ) * PicHeightInTileUnitsY ) / ( num_tile_rows_minus1 + 1 )~~
            ~~posT = ( i     * PicHeightInTileUnitsY ) / ( num_tile_rows_minus1 + 1 )~~
            ~~rowHeight[ i ] = min(PicHeightInTileUnitsY − posT, posB − posT)~~
        rowHeight[ j ] = Ceil( C ÷ D)
            C −= rowHeight[ j ]
            D −= 1
        }
    }
}
where:
    PicHeightInTileUnitsY = Ceil( pic_height_in_luma_samples ÷ TileUnitSizeY )
```

The resulting values in the colWidth and rowHeight lists are in units of luma tile units. If for instance the tile unit size is equal to 32×32, the values are in units of 32 luma samples such that a value of 2 means 64 luma samples.

Table 4 compares the results for the width of the tiles between JVET-L0359 and an embodiment for different picture widths values. The results for JVET-L0359 show inconsistency in the width of the tile columns (colWidth[i]) when the tile unit size changes while the embodiment provides consistent width of the tile columns (colWidth[i]) when the tile unit size changes as it consistently prioritizes the slightly larger tiles to be put on the left side of the picture.

TABLE 4

| Picture width (in luma samples) | Tile unit size | PicWidthInTileUnitsY | JVET-L0359 colWidth[i], i = 0, 1 (in tile unit size) | JVET-L0359 colWidth[i], i = 0, 1 (in luma samples) | First Embodiment colWidth[i], i = 0, 1 (in tile unit size) | First Embodiment colWidth[i], i = 0, 1 (in luma samples) |
|---|---|---|---|---|---|---|
| 2160 | 32 | Ceil(67.5) = 68 | 34, 34 | 1072, 1088 Smaller tile starts the grid | 34, 34 | 1088, 1072 Larger tile starts the grid |
|  | 16 | 135 | 67, 68 | 1088, 1072 Larger tile starts the grid | 68, 67 | 1088, 1072 Larger tile starts the grid |
| 1080 | 16 | Ceil(67.5) = 68 | 34, 34 | 544, 536 Larger tile starts the grid | 34, 34 | 544, 536 Larger tile starts the grid |
|  | 8 | 135 | 67, 68 | 536, 544 Smaller tile starts the grid | 68, 67 | 544, 536 Larger tile starts the grid |
| 480 | 128 | Ceil(3.75) = 4 | 2, 2 | 256, 224 Larger tile starts the grid | 2, 2 | 256, 224 Larger tile starts the grid |
|  | 32 | 15 | 7, 8 | 224, 256 Smaller tile starts the grid | 8, 7 | 256, 224 Larger tile starts the grid |

Table 4 shows tile column width calculated when uniform_spacing_flag=1, num_tile_columns_minus1=1, using the flexible tile splitting as in JVET-L0359 compared with a first embodiment.

In the first embodiment, a decoder may perform all or a subset of the following steps:

1. Decode information that one or more pictures are partitioned into more than one segment from one or more syntax elements in the bitstream. The syntax is preferably located in a picture parameter set. The syntax may specify a number R indicating the number of segment rows and a number C indicating the number of segment columns.

2. Decode information that the spatial segmentation is uniform from one or more syntax elements in the bitstream. The syntax is preferably located in a picture parameter set. The syntax may consist of a one-bit flag specifying whether the spatial segmentation is uniform or not.

3. Determine a segment unit size S either from one or more syntax elements or by using a predefined segment unit size. If a predefined unit size is used, it may be equal to the size of a CTU or the size of a CTU in one dimension. For instance, if the CTU size is equal to 128×128, the segment unit size S may be equal to 128 (or 128×128).

4. Calculate the size of the picture in number of segment units. The calculation may be done separate for the height and width of the picture such that the horizontal size (HS) is set equal to the picture width in luma samples divided by the segment unit size S. The vertical size (VS) may be set equal to the picture height in luma samples divided by the segment unit size.

5. Derive the width and heights of segments (e.g. all the segments) from the number of segments in the picture and the segment unit size S. The derivation is done in a loop over the number of segments where the number of segments yet to be segmented and the size of the picture yet to be segmented in number of segment units is updated in each iteration of the loop.

The derivation may be done in two separate loops:

a. Derive the segment column widths from the picture width in number of tile units and the number of segment columns C by the following substeps:
   i. Set the picture width yet to be segmented (A) equal to the value HS
   ii. Set the number of segment columns yet to be segmented (B) equal to the value C
   iii. Derive the column widths in a loop where one width value is derived per iteration and where the number of segment columns yet to be segmented (B) and the picture width yet to be segmented (A) are both updated in each iteration. The iteration may be executed C times.
      1. The derived column width W may be set equal to Ceil(A÷B)
      2. The variable A may then be updated to A-W and the variable B may be updated to B-1 b. Derive the segment row heights from the picture height in number of tile units and the number of segment rows R by the following substeps:
   i. Set the picture height yet to be segmented (A) equal to the value VS
   ii. Set the number of segment rows yet to be segmented (B) equal to the value R
   iii. Derive the row heights in a loop where one height value is derived per iteration and where the number of segment rows yet to be segmented (B) and the picture height yet to be segmented (A) are both updated in each iteration. The iteration may be executed R times.
      1. The derived row height H may be set equal to Ceil(A÷B)
      2. The variable A may then be updated to A-H and the variable B may be updated to B-1

6. Derive the spatial location for a current block using derived segment widths and derived segment heights.

7. Decode the current block using the derived spatial location. Store the decoded sample values for the current block in memory at memory positions corresponding to the derived spatial location.

In a variant of this embodiment, the function Ceil( ) can be replaced by function Floor( ) in only horizontal, or only vertical or both directions.

In a variant of this embodiment, a flag may choose between the two functions Ceil( ) and Floor( ) In some embodiments, there may be two independent flags for the horizontal and vertical directions.

Embodiment 2. Specified Order

In the second embodiment, the width of the segments in a row or the height of the segments in a column follows a specified order. This specified order may be signaled in the bitstream using a template pattern in the form of a sequence of bits. Segments may be tiles in a picture and so in this embodiment, the shape of the preferred ripple on the tile sizes is specified. For example, all slightly wider tiles are in the left side of the picture. This may be done by a template pattern expressed in the form of a sequence of bits that specifies Ceil( ) or Floor( ) function in every iteration of the loop over tiles to specify the tile width (or height). Function Ceil( ) may be represented by 1 and function Floor( ) may be represented by 0 in the template bit sequence. As an example, template 110 would specify Ceil( ) function in the first two tiles and function Floor( ) in the third iteration of the loop for specifying the tile size. The pattern may be periodically repeated if the number of tiles is larger than the length of the template bit sequence.

Embodiment 3. Binary Tile Splits

In the third embodiment, the binary segment split with an explicit ordering of the segment width or height is applied to the width or height of the picture. Segments may be tiles in a picture and so the binary partitioning is used for partitioning the picture into $2^n$ tiles with uniform tile sizes. A predefined ripple pattern (as in the second embodiment) may be used in combination with this embodiment. The binary partitioning may carry on hierarchically until the algorithm reaches the specified number of segments or only up to a defined number of steps and the rest of the segment divisions being carried out by other methods. As an example, the total size is divided by 2 in a first step where it is specified to assign the smaller or larger segment to the left or right. In each of the subsequent steps, each of the left and right segments are divided into two parts using the next binary partitioning level and the specified rule for the position of possibly smaller or larger segment.

Embodiment 4. Default Ordering of the Ripple

In the fourth embodiment, the width of the segments in a row or the height of the segments in a column of a picture follows a specified default order for the width or height of the segments. Segments may be tiles in a picture and so a default preferred ordering is defined for managing the ripples in the segment sizes. The default ripple pattern may be signaled in the bitstream. In a variant of this embodiment the default pattern may be overwritten. In another variant of this embodiment a flag can specify if the default ordering or another specified ordering is being used.

Figure 7:
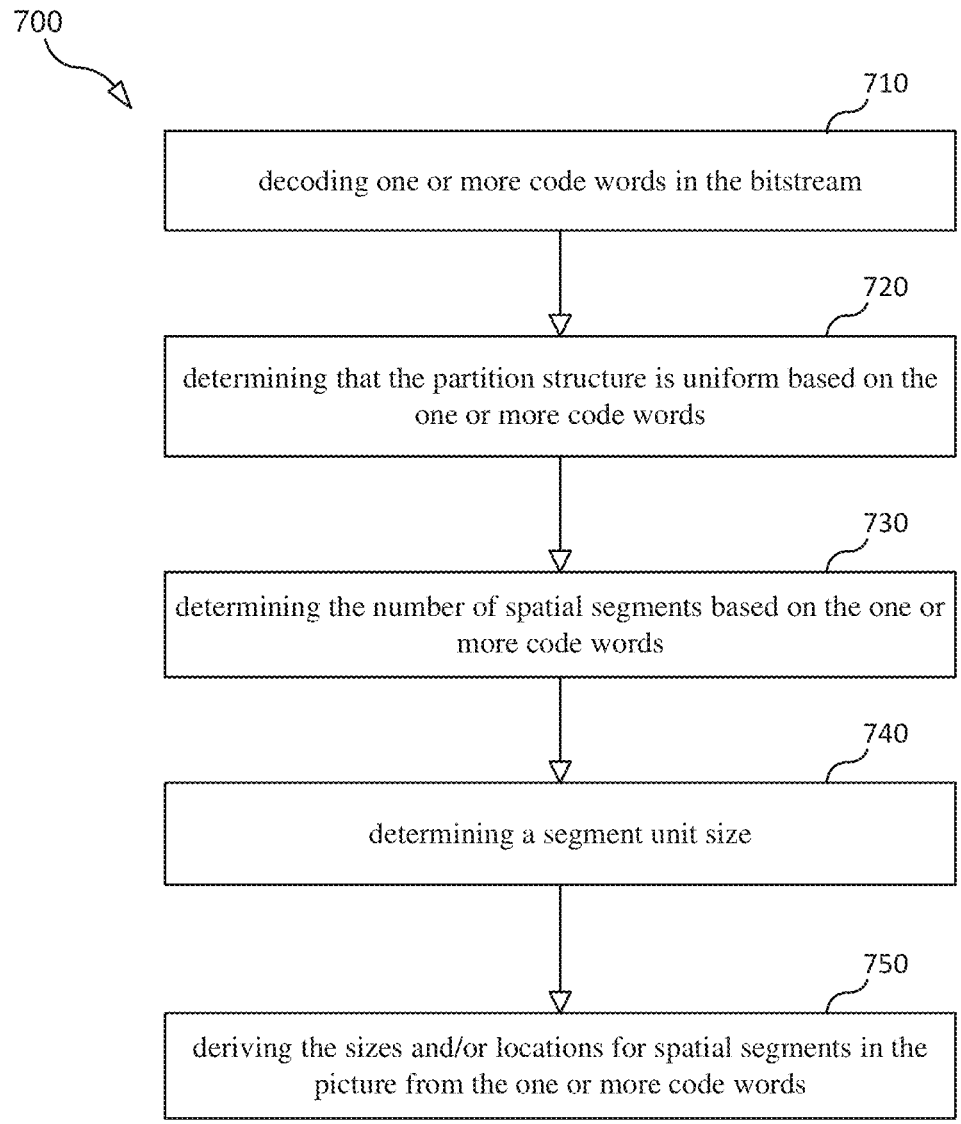
FIG. 7 is a flow chart illustrating a process according to an embodiment.

FIG. 7 is a flow chart illustrating a process 700 according to an embodiment. Process 700 is a method for decoding a picture 10 comprising a number of units 8 from a bitstream, the picture being partitioned into at least two spatial segments 11 by a partition structure 13. Process 700 may begin in steps 710. Step 710 comprises decoding one or more code words in the bitstream. Steps 720 comprises determining that the partition structure is uniform based on the one or more code words. Step 730 comprises determining the number of spatial segments based on the one or more code words. Step 740 comprises determining a segment unit size. Step 750 comprises deriving the sizes and/or locations for spatial segments in the picture from the one or more code words. In one embodiment, deriving the sizes and/or locations for spatial segments in the picture comprises a first loop over the number of spatial segments in a first dimension or direction, and a number of remaining segment units in the first dimension or direction to be segmented is calculated inside the first loop. In some embodiments, a number of remaining segments in the first dimension is calculated inside the first loop.

In some embodiments, the derivation of the segment sizes and/or locations comprises a second loop over the number of spatial segments in a second dimension or direction other than the first dimension or direction, and the number of remaining segment units in the second dimension or direction to be segmented is calculated inside the second loop. In some embodiments, a number of remaining segments in the second dimension or direction is calculated inside the second loop.

In some embodiments, the first dimension or direction is a horizontal dimension or direction and the second dimension or direction is a vertical dimension or direction.

In some embodiments, the width of the segments in a row or the height of the segments in a column follows a specified order.

In some embodiments, the width of the segments in a row or the height of the segments in a column are in a never ascending or a never descending order.

In some embodiments, a binary segment split with an explicit ordering of the segment width or height is applied to the width or height of the picture.

In some embodiments, the width of the segments in a row or the height of the segments in a column of a picture follows a specified default order for the width or height of the segments.

In some embodiments, the segment unit size is equal to the size of the coding tree unit (CTU).

In some embodiments, the segment unit size is smaller than the size of the coding tree unit (CTU). In some embodiments, the segment unit size is larger than the size of the CTU. In some embodiments, a segment is a tile.

In some embodiments, deriving the sizes comprises: deriving a list Sizes[ ] as:

```
A = PicWidth InSegmentUnits
B = NumberOfSegmentColumns
for( i = 0; i < NumberOfSegmentColumns; i++ ) {
    Sizes[ i ] = Round( A ÷ B)
    A = A − Sizes[ i ]
    B = B − 1
}
``` where NumberOfSegmentColumns is the number of segment columns, PicWidthInSegmentUnits is the width of the picture in segment units, Round( ) is either the Floor( ) function or the Ceil( ) function, and ÷ is division without truncation or rounding.

In some embodiments, deriving the sizes comprises: deriving a list Sizes[ ] as:

```
A = PicHeightInSegmentUnits
B = NumberOfSegmentRows
for( i = 0; i < NumberOfSegmentRows; i++ ) {
    Sizes[ i ] = Round( A ÷ B)
    A = A − Sizes[ i ]
    B = B − 1
}
``` where NumberOfSegmentRows is the number of segment rows, PicHeightInSegmentUnits is the height of the picture in segment units, Round( ) is either the Floor( ) function or the Ceil( ) function, and ÷ is division without truncation or rounding.

In some embodiments, the segments 11 are independent with respect to other segments 11 such that the derivation of any intra prediction mode for any unit 16 in a current segment 15 depends only on previously derived intra prediction modes in units 17 that belong to the current segment 15 and does not depend on any intra prediction mode in any unit 18 that belongs to a different segment 14.

In some embodiments, the method includes a further step of partitioning the segments to uniform widths or heights follows a fixed ripple pattern independent from the number of the spatial segments.

Figure 8:
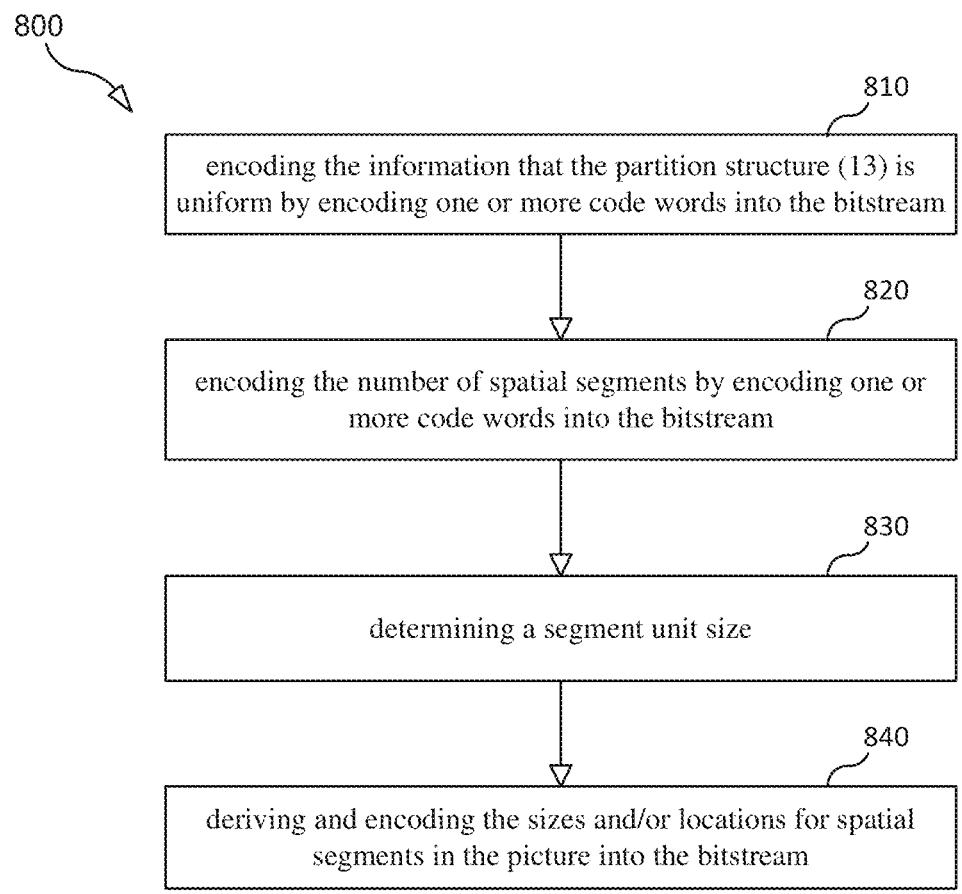
FIG. 8 is a flow chart illustrating a process according to an embodiment.

FIG. 8 is a flow chart illustrating a process 800 according to an embodiment. Process 800 is a method for encoding a picture 10 comprising a number of units 8 into a bitstream, the picture being partitioned into at least two spatial segments 11 by a uniform partition structure 13. The method includes encoding the information that the partition structure 13 is uniform by encoding one or more code words into the bitstream (step 810); encoding the number of spatial segments by encoding one or more code words into the bitstream (step 820); determining a segment unit size (step 830); and deriving and encoding the sizes and/or locations for all spatial segments in the picture into the bitstream (step 840), wherein the derivation of the segment sizes comprises a first loop over the number of spatial segments in a first dimension or direction, and the number of remaining segment units in the first dimension or direction to be segmented is calculated inside the first loop. In some embodiments a number of remaining segments in the first dimension or direction is also calculated inside the first loop.

In some embodiments, the derivation of the segment sizes and/or locations comprises a second loop over the number of spatial segments in a second dimension or direction other than the first dimension or direction, and the number of remaining segment units in the second dimension or direction to be segmented is calculated inside the second loop. In some embodiments a number of remaining segments in the second dimension or direction is also calculated inside the second loop.

In some embodiments, the first dimension or direction is a horizontal dimension or direction and the second dimension or direction is a vertical dimension or direction.

Figure 9:
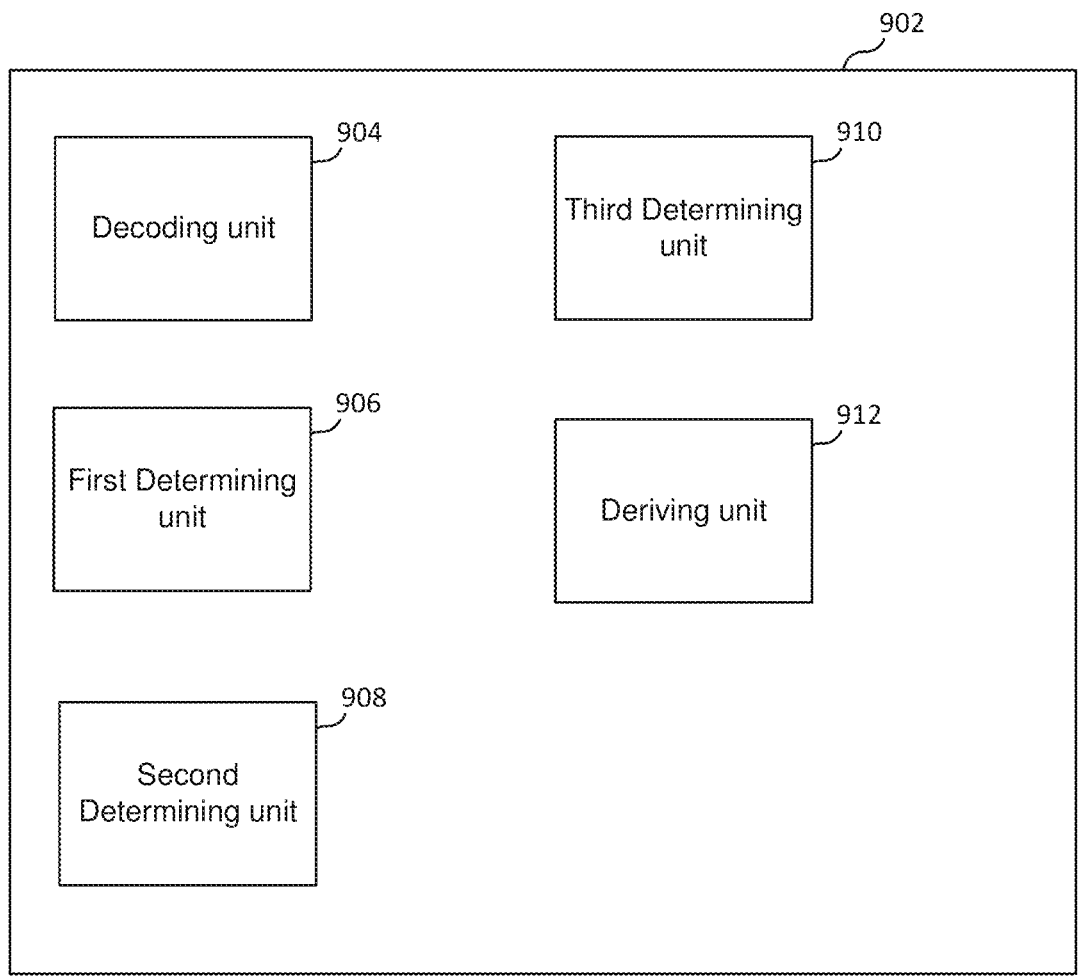
FIG. 9 is a diagram showing functional units of a decoder according to one embodiment.

FIG. 9 is a diagram showing functional units of a decoder 902 according to some embodiments. As shown in FIG. 9, decoder 902 includes a decoding unit 904 for decoding one or more code words in the bitstream; a first determining unit 906 for determining that the partition structure is uniform based on the one or more code words; a second determining unit 908 for determining the number of spatial segments based on the one or more code words; a third determining unit 910 for determining a segment unit size; and a deriving unit 912 for deriving the sizes and/or locations for all spatial segments in the picture from the one or more code words, wherein the derivation of the segment sizes and/or locations comprises a first loop over the number of spatial segments in a first dimension and a second loop over the number of spatial segments in a second dimension, the number of remaining segment units in the first dimension to be segmented is calculated inside the first loop, and the number of remaining segment units in the second dimension to be segmented and the number of remaining segments in the second dimension are calculated inside the second loop. In some embodiments, a number of remaining segments in the first dimension is also calculated inside the first loop and a number of remaining segments in the second dimension is also calculated inside the second loop.

Figure 10:
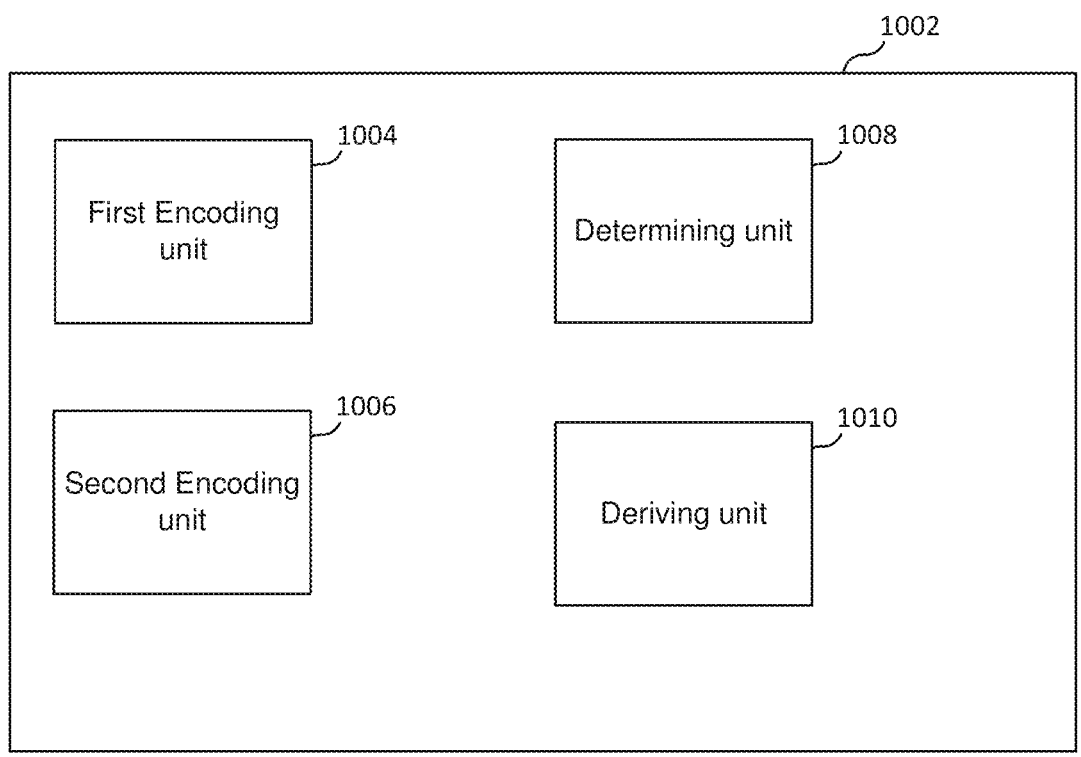
FIG. 10 is a diagram showing functional units of an encoder according to one embodiment.

FIG. 10 is a diagram showing functional units of an encoder 1002 according to some embodiments. As shown in FIG. 10, encoder 1002 includes a first encoding unit 1004 for encoding the information that the partition structure 13 is uniform by encoding one or more code words into the bitstream; a second encoding unit 1006 for encoding the number of spatial segments by encoding one or more code words into the bitstream; a determining unit 1008 for determining a segment unit size; and a deriving unit 1010 for deriving and encoding the sizes and/or locations for all spatial segments in the picture into the bitstream, wherein the derivation of the segment sizes comprises a first loop over the number of spatial segments in a first dimension and a second loop over the number of spatial segments in a second dimension, the number of remaining segment units in the first dimension to be segmented is calculated inside the first loop, and the number of remaining segment units in the second dimension to be segmented is calculated inside the second loop.

In some embodiments, the encoder is configured to define a partition structure that divides a picture into a number of uniform spatial segments, wherein each spatial segment comprises at least one unit, and wherein derivation of the segment sizes is performed in a first loop over the number of spatial segments in a first dimension and a second loop over the number of spatial segments in a second dimension, wherein the number of remaining segment units in the first dimension to be segmented is calculated inside the first loop, and wherein the number of remaining segment units in the second dimension to be segmented is calculated inside the second loop; encode the plurality of spatial segments in accordance with the partition structure to generate a plurality of coded spatial segments, wherein each coded spatial segment corresponds to one of the spatial segments of the partition structure, and each coded spatial segment is independent such that derivation of any intra prediction mode for a first unit of the first spatial segment depends on a derived intra prediction mode for a second unit of the first spatial segment and is independent of any intra prediction mode for units of other spatial segments of the partition structure; and generate a bit stream comprising the plurality of coded spatial segments and information indicating the uniform partition structure used to divide the picture into the plurality of spatial segments.

Figure 11:
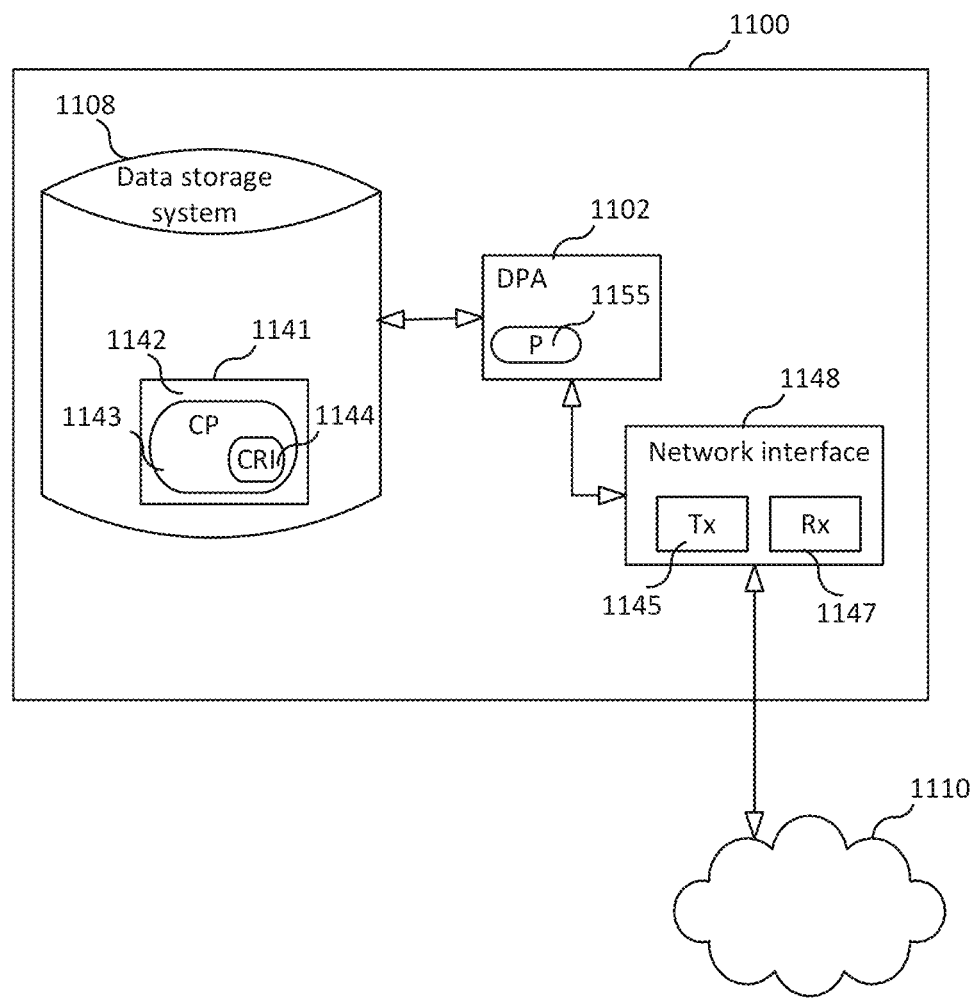
FIG. 11 is a block diagram of an apparatus according to some embodiments.
Figure 12:
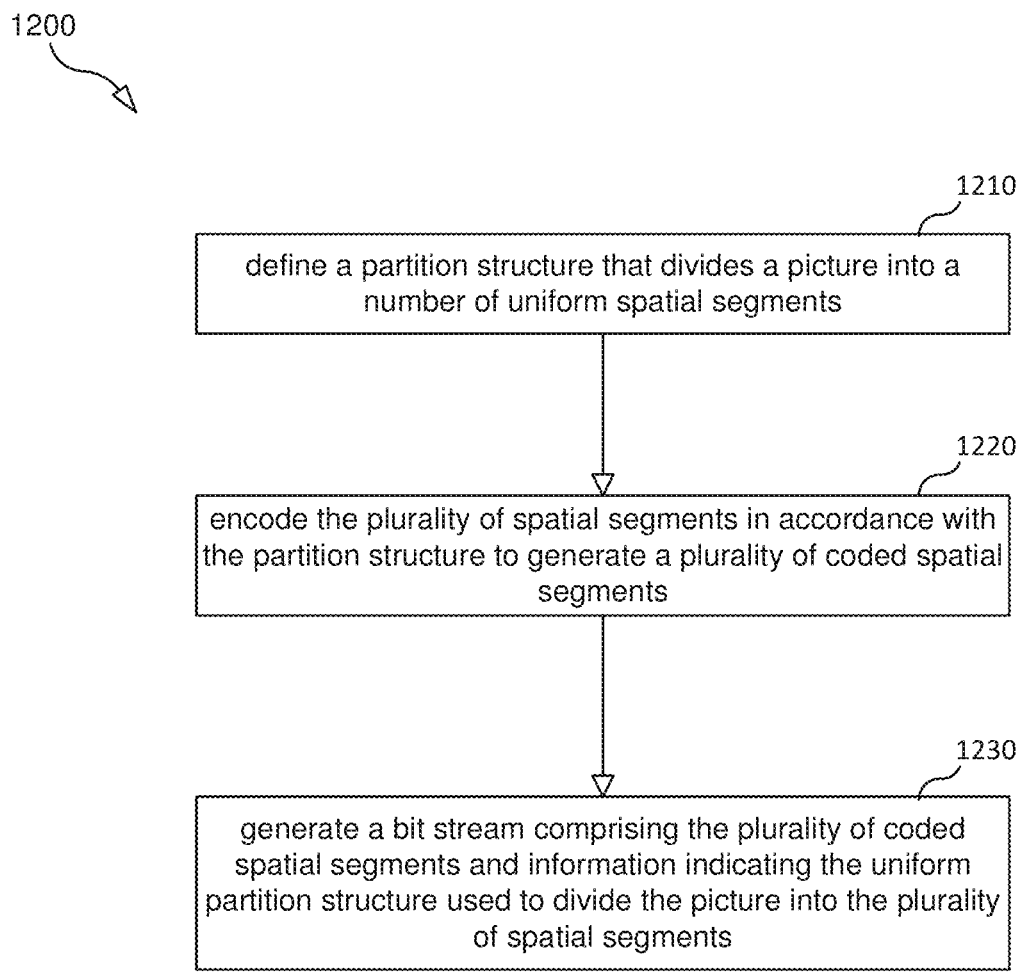
FIG. 12 is a flow chart illustrating a process according to an embodiment.

FIG. 11 is a block diagram of an apparatus 1100 for implementing decoder 902 and/or encoder 1002, according to some embodiments. When apparatus 1100 implements decoder 902, apparatus 1100 may be referred to as a "decoding apparatus 1100," and when apparatus 1100 implements encoder 1002, apparatus 1100 may be referred to as an "encoding apparatus 1100." As shown in FIG. 11, apparatus 1100 (a.k.a., "node") may comprise: processing circuitry (PC) 1102, which may include one or more processors (P) 1155 (e.g., a general purpose microprocessor and/or one or more other processors, such as an application specific integrated circuit (ASIC), field-programmable gate arrays (FPGAs), and the like); a network interface 1148 comprising a transmitter (Tx) 1145 and a receiver (Rx) 1147 for enabling the apparatus 1100 to transmit data to and receive data from other nodes connected to a network 1110 (e.g., an Internet Protocol (IP) network) to which network interface 1148 is connected; and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes the apparatus 1100 to perform steps described herein (e.g., steps described herein with reference to the flow charts). In other embodiments, the apparatus 1100 may be configured to perform steps described herein without the need for code. That is, for example, PC 1102 may consist merely of one or more ASICs. Hence, the features of the embodiments described herein may be implemented in hardware and/or software.

Summary of Various Embodiments

A1a. A method 700 for decoding a picture 10 comprising a number of units 8 from a bitstream, the picture being partitioned into a number of spatial segments 11 by a partition structure 13, the number of spatial segments being greater than or equal to two, the method comprising: decoding 710 one or more code words in the bitstream; determining 720 that the partition structure is uniform based on the one or more code words; determining 730 the number of spatial segments based on the one or more code words; determining 740 a segment unit size; and deriving 750 the sizes and/or locations for spatial segments in the picture from the one or more code words, wherein deriving the sizes and/or locations for spatial segments in the picture comprises a first loop over the number of spatial segments in a first dimension or direction, and a number of remaining segment units in the first dimension or direction to be segmented is calculated inside the first loop.

A1b. The method of embodiment A1a, wherein the first loop over the number of spatial segments comprises a first loop over the number of spatial segments with size equal to a segment size in a first dimension or direction.

A2a. The method of embodiment A1a or A1b, wherein deriving the sizes and/or locations further comprises a second loop over the number of spatial segments in a second dimension or direction other than the first dimension or direction, and a number of remaining segment units in the second dimension or direction to be segmented is calculated inside the second loop.

A2b. The method of embodiment A2a, wherein a segment size in the first dimension or direction is a width of a segment in a row and a segment size in the second dimension or direction is a height of a segment in a column, or a segment size in the first dimension or direction is a height of a segment in a column and a segment size in the second dimension or direction is a width of a segment in a row.

A2c. The method of embodiment A2a or A2b, wherein the second loop over the number of spatial segments comprises a second loop over the number of spatial segments with size equal to a segment size in a second dimension or direction.

A3. The method of embodiment A2a, A2b or A2c, wherein the first dimension or direction is a horizontal dimension or direction and the second dimension or direction is a vertical dimension or direction, or the first dimension or direction is a vertical dimension or direction and the second dimension or direction is a horizontal dimension or direction.

A4. The method of any one of embodiments A1a-A3, wherein the width of the segments in a row or the height of the segments in a column follows a specified order.

A5. The method of any one of embodiments A1a-A4, wherein the width of the segments in a row or the height of the segments in a column are in a never ascending or a never descending order.

A6. The method of any one of embodiments A1a-A5 wherein a binary segment split with an explicit ordering of the segment width or height is applied to the width or height of the picture.

A7. The method of any one of embodiments A1a-A6 wherein the width of the segments in a row or the height of the segments in a column of a picture follows a specified default order for the width or height of the segments.

A8. The method of any one of embodiments A1a-A7, wherein the segment unit size is equal to the size of the coding tree unit (CTU).

A9. The method of any one of embodiments A1a-A7, wherein the segment unit size is smaller than the size of the coding tree unit (CTU).

A10. The method of any one of embodiments A1a-A7, wherein the segment unit size is larger than the size of the CTU.

A11. The method of any one of embodiments A1a-A10, where a segment is a tile.

A12. The method of any one of embodiments A1a-A11, wherein deriving the sizes comprises deriving a list Sizes[ ] as: A=PicWidthInSegmentUnits
B=NumberOfSegmentColumns
for(i=0; i<NumberOfSegmentColumns; i++) {

Sizes[i]=Round(A÷B)

A=A−Sizes[i]

B=B−1

} where NumberOfSegmentColumns is the number of segment columns, PicWidthInSegmentUnits is the width of the picture in segment units, Round( ) is either the Floor( ) function or the Ceil( ) function, and ÷ is division without truncation or rounding.

A13. The method of any one of embodiments A1a-A12, where deriving the sizes comprises deriving a list Sizes[ ] as:
A=PicHeightInSegmentUnits
B=NumberOfSegmentRows
for(i=0; i<NumberOfSegmentRows; i++) {

Sizes[i]=Round(A÷B)

A=A−Sizes[i]

B=B−1

} where NumberOfSegmentRows is the number of segment rows, PicHeightInSegmentUnits is the height of the picture in segment units, Round( ) is either the Floor( ) function or the Ceil( ) function, and ÷ is division without truncation or rounding.

A14. The method of any one of embodiments A1a-A13, wherein the segments 11 are independent with respect to other segments 11 such that the derivation of any intra prediction mode for any unit 16 in a current segment 15 depends only on previously derived intra prediction modes in units 17 that belong to the current segment 15 and does not depend on any intra prediction mode in any unit 18 that belongs to a different segment 14.

A15. The method of any one of embodiments A1a-A14, the method further comprising: partitioning the segments to uniform widths or heights follows a fixed ripple pattern independent from the number of the spatial segments.

A16. The method of any one of embodiments A2a-A15, wherein a number of remaining segments in the second dimension or direction is calculated inside the second loop.

A17. The method of any one of embodiments A1a-A16, wherein a number of remaining segments in the first dimension or direction is calculated inside the first loop.

B1a. A method 800 for encoding a picture 10 comprising a number of units 8 into a bitstream, the picture being partitioned into a number of spatial segments 11 by a uniform partition structure 13, the number of spatial segments being greater than or equal to two, the method comprising: encoding 810 the information that the partition structure 13 is uniform by encoding one or more code words into the bitstream; encoding 820 the number of spatial segments by encoding one or more code words into the bitstream; determining 830 a segment unit size; and deriving 840 and encoding the sizes and/or locations for spatial segments in the picture into the bitstream, wherein deriving the sizes and/or locations for spatial segments in the picture comprises a first loop over the number of spatial segments in a first dimension or direction, and a number of remaining segment units in the first dimension or direction to be segmented is calculated inside the first loop.

B1b. The method of embodiment B1a, wherein the first loop over the number of spatial segments comprises a first loop over the number of spatial segments with size equal to a segment size in a first dimension or direction.

B2a. The method of embodiment B1a or B1b, wherein the derivation of the segment sizes and/or locations comprises a second loop over the number of spatial segments in a second dimension or direction other than the first dimension or direction, and a number of remaining segment units in the second dimension or direction to be segmented is calculated inside the second loop.

B2b. The method of embodiment B2a, wherein a segment size in the first dimension or direction is a width of a segment in a row and a segment size in the second dimension or direction is a height of a segment in a column, or a segment size in the first dimension or direction is a height of a segment in a column and a segment size in the second dimension or direction is a width of a segment in a row.

B2c. The method of embodiment B2a or B2b, wherein the second loop over the number of spatial segments comprises a second loop over the number of spatial segments with size equal to a segment size in a second dimension or direction.

B3. The method of embodiment B2a, B2b, or B2c, wherein the first dimension or direction is a horizontal dimension or direction and the second dimension or direction is a vertical dimension or direction, or the first dimension or direction is a vertical dimension or direction and the second dimension or direction is a horizontal dimension or direction.

B4. The method of embodiment B2a, B2b, B2c, or B3, wherein a number of remaining segments in the second dimension or direction is calculated inside the second loop.

B5. The method of any one of embodiments B1a-B4, wherein a number of remaining segments in the first dimension or direction is calculated inside the first loop.

C1. A method 1200 for encoding a picture 10, the method comprising: defining 1210 a partition structure that divides the picture 10 into a number of uniform spatial segments, wherein each spatial segment comprises at least one unit, and wherein derivation of the segment sizes is performed in a first loop over the number of spatial segments in a first dimension or direction and a second loop over the number of spatial segments in a second dimension or direction, wherein the number of remaining segment units in the first dimension or direction to be segmented is calculated inside the first loop, and wherein the number of remaining segment units in the second dimension or direction to be segmented is calculated inside the second loop; encoding 1220 the plurality of spatial segments in accordance with the partition structure to generate a plurality of coded spatial segments, wherein each coded spatial segment corresponds to one of the spatial segments of the partition structure, and each coded spatial segment is independent such that derivation of any intra prediction mode for a first unit of the first spatial segment depends on a derived intra prediction mode for a second unit of the first spatial segment and is independent of any intra prediction mode for units of other spatial segments of the partition structure; and generating 1230 a bit stream comprising the plurality of coded spatial segments and information indicating the uniform partition structure used to divide the picture into the plurality of spatial segments.

D1. A computer program 1143 comprising instructions 1144 which when executed by processing circuitry 1102 causes the processing circuitry 1102 to perform the method of any one of embodiments A1a-C1.

D2. A carrier containing the computer program of embodiment D1, wherein the carrier is one of an electronic signal, an optical signal, a radio signal, and a computer readable storage medium 1142.

E1. A decoding apparatus 1100 for decoding a picture 10 comprising a number of units 8 from a bitstream, the picture being partitioned into a number of spatial segments 11 by a partition structure 13, the number of spatial segments being greater than or equal to two, the decoding apparatus 1100 being configured to: decode one or more code words in the bitstream; determine that the partition structure is uniform based on the one or more code words; determine the number of spatial segments based on the one or more code words; determine a segment unit size; and derive the sizes and/or locations for spatial segments in the picture from the one or more code words, wherein deriving the sizes and/or locations for spatial segments in the picture comprises a first loop over the number of spatial segments in a first dimension or direction, and the decoding apparatus is configured to calculate a number of remaining segment units in the first dimension or direction to be segmented inside the first loop.

E2. The decoding apparatus 1100 of embodiment E1, the decoding apparatus 1100 being further configured to perform the method of any one of embodiments A2-A17.

F1. A decoding apparatus 1100 for decoding a picture 10, the decoding apparatus 1100 comprising: a computer readable storage medium 1142; and processing circuitry 1102 coupled to the computer readable storage medium, wherein the processing circuitry is configured to cause the decoding apparatus 1100 to perform the method of any one of embodiments A1a-A17.

G1. An encoding apparatus 1100 for encoding a picture 10 comprising a number of units 8 into a bitstream, the picture being partitioned into a number of spatial segments 11 by a uniform partition structure 13, the number of spatial segments being greater than or equal to two, the encoding apparatus 1100 being configured to: encode the information that the partition structure 13 is uniform by encoding one or more code words into the bitstream; encode the number of spatial segments by encoding one or more code words into the bitstream; determine a segment unit size; and derive and encoding the sizes and/or locations for spatial segments in the picture into the bitstream, wherein deriving the sizes and/or locations for spatial segments in the picture comprises a first loop over the number of spatial segments in a first dimension or direction, and the encoding apparatus is further configured to calculate a number of remaining segment units in the first dimension or direction to be segmented inside the first loop.

G2. The encoding apparatus 1100 of embodiment G1, the encoding apparatus 1100 being further configured to perform the method of any one of embodiments B2-B5.

H1. An encoding apparatus 1100 for encoding a picture 10, the encoding apparatus 1100 being configured to: define a partition structure that divides a picture into a number of uniform spatial segments, wherein each spatial segment comprises at least one unit, and wherein derivation of the segment sizes is performed in a first loop over the number of spatial segments in a first dimension or direction and a second loop over the number of spatial segments in a second dimension or direction, wherein the number of remaining segment units in the first dimension or direction to be segmented is calculated inside the first loop, and wherein the number of remaining segment units in the second dimension or direction to be segmented is calculated inside the second loop; encode the plurality of spatial segments in accordance with the partition structure to generate a plurality of coded spatial segments, wherein each coded spatial segment corresponds to one of the spatial segments of the partition structure, and each coded spatial segment is independent such that derivation of any intra prediction mode for a first unit of the first spatial segment depends on a derived intra prediction mode for a second unit of the first spatial segment and is independent of any intra prediction mode for units of other spatial segments of the partition structure; and generate a bit stream comprising the plurality of coded spatial segments and information indicating the uniform partition structure used to divide the picture into the plurality of spatial segments.

I1. An encoding apparatus 1100 for encoding a picture 10, the encoding apparatus 1100 comprising: a computer readable storage medium 1142; and processing circuitry 1102 coupled to the computer readable storage medium, wherein the processing circuitry is configured to cause the encoding apparatus 1100 to perform the method of any one of embodiments B1-B5 or C1.

PA1. A method for decoding a picture 10 comprising a number of units 8 from a bitstream, the picture being partitioned into at least two spatial segments 11 by a partition structure 13, the method comprising: decoding one or more code words in the bitstream; determining that the partition structure is uniform based on the one or more code words; determining the number of spatial segments based on the one or more code words; determining a segment unit size; and deriving the sizes and/or locations for all spatial segments in the picture from the one or more code words, wherein the derivation of the segment sizes and/or locations comprises a first loop over the number of spatial segments in a first dimension or direction, and the number of remaining segment units in the first dimension or direction to be segmented and the number of remaining segments in the first dimension or direction are calculated inside the first loop.

PA2. The method of embodiment PA1, wherein the derivation of the segment sizes and/or locations comprises a second loop over the number of spatial segments in a second dimension or direction other than the first dimension or direction, and the number of remaining segment units in the second dimension or direction to be segmented and the number of remaining segments in the second dimension or direction are calculated inside the second loop.

PA3. The method of embodiment PA2, wherein the first dimension or direction is a horizontal dimension or direction and the second dimension or direction is a vertical dimension or direction.

PA4. The method of any one of embodiments PA1-PA3, wherein the width of the segments in a row or the height of the segments in a column follows a specified order.

PA5. The method of any one of embodiments PA1-PA3, wherein the width of the segments in a row or the height of the segments in a column are in a never ascending or a never descending order.

PA6. The method of any one of embodiments PA1-PA3, wherein a binary segment split with an explicit ordering of the segment width or height is applied to the width or height of the picture.

PA7. The method of any one of embodiments PA1-PA3, wherein the width of the segments in a row or the height of the segments in a column of a picture follows a specified default order for the width or height of the segments.

PA8. The method of any one of embodiments PA1-PA7, wherein the segment unit size is equal to the size of the coding tree unit (CTU).

PA9. The method of any one of embodiments PA1-PA8, wherein the segment unit size is smaller than the size of the coding tree unit (CTU).

PA10. The method of any one of embodiments PA1-PA8, wherein the segment unit size is larger than the size of the CTU.

PA11. The method of any one of embodiments PA1-PA10, where any segment is a tile.

PA12. The method of any one of embodiments PA1-PA11, wherein deriving the sizes comprises deriving a list Sizes[ ] as: A=PicWidthInTileUnits
B=NumberOfSegmentColumns
for(i=0; i<NumberOfSegmentColumns; i++) {

Sizes[i]=Round(A÷B)

A=A−Sizes[i]

B=B−1

} where NumberOfSegmentColumns is the number of segment columns, PicWidthInTileUnits is the width of the picture in tile units, Round( ) is either the Floor( ) function or the Ceil( ) function, and ÷ is division without truncation or rounding.

PA13. The method of any one of embodiments PA1-PA12, where deriving the sizes comprises deriving a list Sizes[ ] as: A=PicHeightInTileUnits
B=NumberOfSegmentRows
for(i=0; i<NumberOfSegmentRows; i++) {

Sizes[i]=Round(A÷B)

A=A−Sizes[i]

B=B−1

} where NumberOfSegmentRows is the number of segment rows, PicHeightInTileUnits is the height of the picture in tile units, Round( ) is either the Floor( ) function or the Ceil( ) function, and ÷ is division without truncation or rounding.

PA14. The method of any one of embodiments PA1-PA13, wherein the segments 11 are independent with respect to other segments 11 such that the derivation of any intra prediction mode for any unit 16 in a current segment 15 depends only on previously derived intra prediction modes in units 17 that belong to the current segment 15 and does not depend on any intra prediction mode in any unit 18 that belongs to a different segment 14.

PA15. The method of any one of embodiments PA1-PA14, the method further comprising: partitioning the segments to uniform widths or heights follows a fixed ripple pattern independent from the number of the spatial segments.

PB1. A method for encoding a picture 10 comprising a number of units 8 into a bitstream, the picture being partitioned into at least two spatial segments 11 by a uniform partition structure 13, the method comprising: encoding the information that the partition structure 13 is uniform by encoding one or more code words into the bitstream; encoding the number of spatial segments by encoding one or more code words into the bitstream; determining a segment unit size; and deriving and encoding the sizes and/or locations for all spatial segments in the picture into the bitstream, wherein the derivation of the segment sizes comprises a first loop over the number of spatial segments in a first dimension or direction, and the number of remaining segment units in the first dimension or direction to be segmented and the number of remaining segments in the first dimension or direction are calculated inside the first loop.

PB2. The method of embodiment PB1, wherein the derivation of the segment sizes and/or locations comprises a second loop over the number of spatial segments in a second dimension or direction other than the first dimension or direction, and the number of remaining segment units in the second dimension or direction to be segmented and the number of remaining segments in the second dimension or direction are calculated inside the second loop.

PB3. The method of embodiment PB2, wherein the first dimension or direction is a horizontal dimension or direction and the second dimension or direction is a vertical dimension or direction.

PC1. An encoder circuit configured to: define a partition structure that divides a picture into a number of uniform spatial segments, wherein each spatial segment comprises at least one unit, and wherein derivation of the segment sizes is performed in a first loop over the number of spatial segments in a first dimension and a second loop over the number of spatial segments in a second dimension, wherein the number of remaining segment units in the first dimension to be segmented and the number of remaining segments in the first dimension are calculated inside the first loop, and wherein the number of remaining segment units in the second dimension to be segmented and the number of remaining segments in the second dimension are calculated inside the second loop; encode the plurality of spatial segments in accordance with the partition structure to generate a plurality of coded spatial segments, wherein each coded spatial segment corresponds to one of the spatial segments of the partition structure, and each coded spatial segment is independent such that derivation of any intra prediction mode for a first unit of the first spatial segment depends on a derived intra prediction mode for a second unit of the first spatial segment and is independent of any intra prediction mode for units of other spatial segments of the partition structure; and generate a bit stream comprising the plurality of coded spatial segments and information indicating the uniform partition structure used to divide the picture into the plurality of spatial segments.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a picture, the picture being divided into one or more tile rows and one or more tile columns, the one or more tile columns comprising a first tile column and the one or more tile rows comprising a first tile row, the method comprising:

obtaining a picture width value (PicWidth) indicating a width of the picture;

initializing a loop variable to an initial value;

after initializing a loop variable to an initial value, determining whether the value of the loop variable satisfies a condition; and as a result of determining that the value of the loop variable satisfies the condition, performing a process comprising:
  i) setting a first column width variable associated with the first tile column equal to a first width value specifying a width of the first tile column; and
  ii) calculating a remaining width value by subtracting the first width value from the picture width value.

2. The method of claim 1, wherein the initial value is zero.

3. The method of claim 1, wherein determining whether the value of the loop variable satisfies a condition comprises determining whether the value of the loop variable is not greater than an obtained value.

4. The method of claim 3, wherein the obtained value indicates a number of tile columns.

5. The method of claim 3, wherein the process further comprises incrementing the value of the loop variable by 1.

6. A method for encoding a picture comprising a number of units into a bitstream, the picture being partitioned into a number of spatial segments by a uniform partition structure, the method comprising:

encoding the number of spatial segments by encoding one or more code words into the bitstream;

determining a unit size for the units of the picture; and deriving and encoding the sizes for the spatial segments in the picture into the bitstream, wherein deriving the sizes for the spatial segments in the picture comprises a first loop over the number of spatial segments in a first dimension or direction, and a number of remaining units in the first dimension or direction to be segmented is calculated inside the first loop.

7. The method of claim 6, wherein the first loop over the number of spatial segments comprises a first loop over the number of spatial segments with size equal to a segment size in the first dimension or direction.

8. The method of claim 6, wherein deriving the sizes comprises a second loop over the number of spatial segments in a second dimension or direction other than the first dimension or direction, and a number of remaining units in the second dimension or direction to be segmented is calculated inside the second loop.

9. The method of claim 8, wherein
  a segment size in the first dimension or direction is a width of a spatial segment in a row and a segment size in the second dimension or direction is a height of a spatial segment in a column, or
  a segment size in the first dimension or direction is a height of a spatial segment in a column and a segment size in the second dimension or direction is a width of a spatial segment in a row.

10. The method of claim 8, wherein the second loop over the number of spatial segments comprises a second loop over the number of spatial segments with size equal to a spatial segment size in the second dimension or direction.

11. The method of claim 8, wherein
  the first dimension or direction is a horizontal dimension or direction and the second dimension or direction is a vertical dimension or direction, or
  the first dimension or direction is a vertical dimension or direction and the second dimension or direction is a horizontal dimension or direction.

12. The method of claim 6, wherein the spatial segments are tiles.

13. The method of claim 6, wherein each of the units is a coding tree unit (CTU).

14. A computer program product comprising a non-transitory computer readable medium storing a computer program comprising instructions which when executed by processing circuitry causes the processing circuitry to perform the method of claim 1.

15. A decoding apparatus for decoding a picture, the decoding apparatus comprising:
  a computer readable storage medium; and
  processing circuitry coupled to the computer readable storage medium, wherein the processing circuitry is configured to cause the decoding apparatus to perform the method of claim 1.

16. An encoding apparatus for encoding a picture, the encoding apparatus comprising:
  a computer readable storage medium; and
  processing circuitry coupled to the computer readable storage medium, wherein the processing circuitry is configured to cause the encoding apparatus to perform the method of claim 6.

* * * * *